(12) United States Patent
Okamura et al.

(10) Patent No.: US 10,443,746 B2
(45) Date of Patent: Oct. 15, 2019

(54) PRESSURE REDUCING VALVE UNIT

(71) Applicant: Hitachi Construction Machinery Co., Ltd., Taito-ku, Tokyo (JP)

(72) Inventors: Jun Okamura, Kasumigaura (JP);
Takeshi Kobayashi, Kasumigaura (JP);
Mitsuhiro Yoshimoto, Ibaraki (JP);
Kazuo Takiguchi, Moriya (JP);
Masakazu Andou, Tsuchiura (JP);
Yoshifumi Takimoto, Ushiku (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 15/757,425

(22) PCT Filed: Jan. 16, 2017

(86) PCT No.: PCT/JP2017/001234
§ 371 (c)(1),
(2) Date: Mar. 5, 2018

(87) PCT Pub. No.: WO2017/168956
PCT Pub. Date: Oct. 5, 2017

(65) Prior Publication Data
US 2018/0245700 A1    Aug. 30, 2018

(30) Foreign Application Priority Data

Mar. 30, 2016 (JP) .................................. 2016-068038

(51) Int. Cl.
*F16K 11/07*        (2006.01)
*F16K 31/124*      (2006.01)
(Continued)

(52) U.S. Cl.
CPC ............ *F16K 11/07* (2013.01); *F15B 13/025* (2013.01); *F16K 3/24* (2013.01); *F16K 11/0716* (2013.01);
(Continued)

(58) Field of Classification Search
CPC ........ F16K 17/30; F16K 17/105; F16K 11/07; F16K 11/06; F16K 31/061; F16K 31/426;
(Continued)

(56) References Cited

U.S. PATENT DOCUMENTS 4,616,476 A * 10/1986 Oneyama ............... F15B 13/043
137/596.16
4,649,957 A *  3/1987 Quinn ................. F15B 13/0402
137/625.64
(Continued)

FOREIGN PATENT DOCUMENTS

| JP | 4-62486 U   | 5/1992 |
|----|-------------|--------|
| JP | 4-201616 A  | 7/1992 |
| JP | 2538764 Y2  | 6/1997 |

OTHER PUBLICATIONS

International Search Report (PCT/ISA/210) issued in PCT Application No. PCT/JP2017/001234 dated Mar. 14, 2017 with English translation (six (6) pages).

(Continued)

*Primary Examiner* — Craig J Price
(74) *Attorney, Agent, or Firm* — Crowell & Moring LLP

(57) ABSTRACT

A main spool (24) has a throttle passage (30) that, when the main spool (24) moves to an axial other side against a first return spring (27) in a main spool insertion hole (13), communicates a pilot pressure chamber (25) with a first tank port (15) and limits a flow amount of hydraulic oil to be discharged to the first tank port (15) from the pilot pressure chamber (25). When the main spool (24) moves to the axial (Continued)

other side along the main spool insertion hole (13), the throttle passage (30) communicates the pilot pressure chamber (25) with the first tank port (15) before a state where a first pump port (17) is communicated with an output port (16) and a state where the output port (16) is blocked from the first tank port (15).

4 Claims, 14 Drawing Sheets

(51) Int. Cl.
| | |
|---|---|
| *F16K 31/363* | (2006.01) |
| *F16K 3/24* | (2006.01) |
| *F16K 17/30* | (2006.01) |
| *G05D 16/10* | (2006.01) |
| *F15B 13/02* | (2006.01) |
| *G05D 16/20* | (2006.01) |

(52) U.S. Cl.
CPC ............ *F16K 17/30* (2013.01); *F16K 31/124* (2013.01); *F16K 31/363* (2013.01); *G05D 16/10* (2013.01); *G05D 16/2024* (2019.01); *G05D 16/2097* (2019.01); *Y10T 137/86614* (2015.04)

(58) Field of Classification Search
CPC .......... F16K 3/24; F16K 17/20; F16K 31/124; F16K 31/363; F16K 11/0716; Y10T 137/7762; Y10T 137/86582; Y10T 137/87209; Y10T 137/86614; Y10T 137/86702; G05D 16/0404; G05D 16/2022; G05D 16/10; G05D 16/103; G05D 16/18; G05D 16/2093; G05D 16/2097; G05D 16/2024; F15B 13/025
USPC ......................................... 137/625.64, 625.6
See application file for complete search history.

(56) References Cited

U.S. PATENT DOCUMENTS

| | | | | | |
|---|---|---|---|---|---|
| 4,674,613 | A | * | 6/1987 | Sikorski | F16D 48/066 137/625.64 |
| 4,875,501 | A | * | 10/1989 | Ichihashi | F15B 13/043 137/625.64 |
| 4,966,195 | A | * | 10/1990 | McCabe | F16H 61/0251 137/625.61 |
| 5,042,832 | A | * | 8/1991 | Takahashi | B60G 17/018 137/625.64 |
| 5,217,047 | A | * | 6/1993 | McCabe | F16H 61/0251 137/625.61 |
| 5,261,455 | A | | 11/1993 | Takahashi et al. | |
| 5,924,539 | A | * | 7/1999 | Braun | F16H 61/0276 192/109 F |
| 5,934,322 | A | * | 8/1999 | Oehme | F16H 61/0206 137/596.16 |
| 6,327,959 | B1 | * | 12/2001 | Takahashi | E02F 9/2267 137/625.68 |
| 8,789,553 | B2 | * | 7/2014 | Buttner | F15B 13/0839 137/339 |
| 9,494,247 | B2 | * | 11/2016 | Oikawa | F16K 31/426 |
| 9,528,620 | B2 | * | 12/2016 | Pastuschka | F16K 17/10 |
| 2006/0231147 | A1 | * | 10/2006 | Pride | F16K 11/07 137/625.64 |
| 2017/0002932 | A1 | * | 1/2017 | Fuller | F16K 1/46 |

OTHER PUBLICATIONS

Japanese-language Written Opinion (PCT/ISA/237) issued in PCT Application No. PCT/JP2017/001234 dated Mar. 14, 2017 (three (3) pages).

* cited by examiner

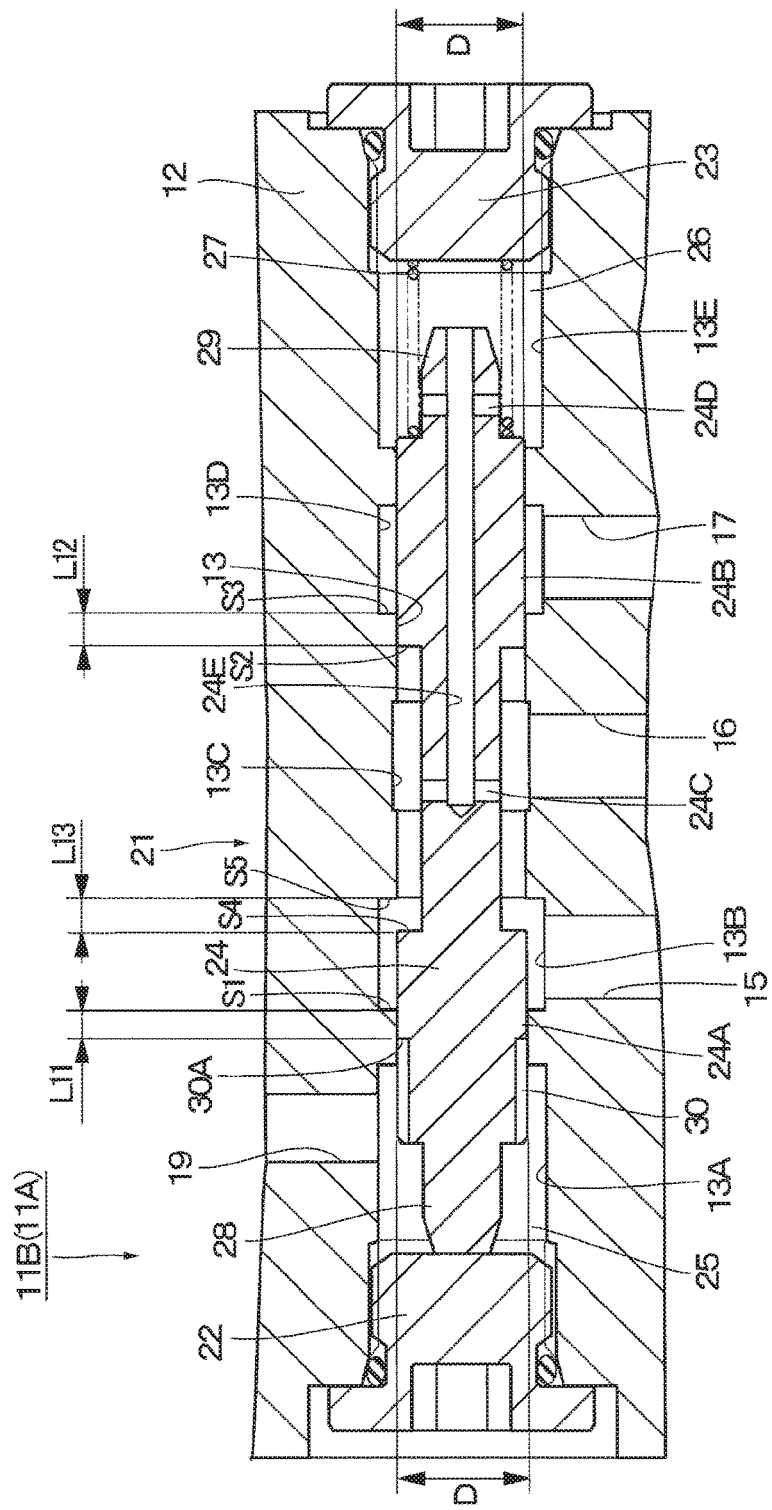

PRESSURE REDUCING VALVE UNIT

TECHNICAL FIELD

The present invention relates to pressure reducing valve units used preferably for performing pressure control in a hydraulic circuit of a construction machine, for example, and particularly, to a solenoid type pressure reducing valve unit configured to control a pressure in accordance with a supply electric current.

BACKGROUND ART

In recent years, in a construction machine represented by a hydraulic excavator, many equipment devices configured to perform electronic control have been adopted for a reduction on fuel consumption and an improvement on controllability. There is known a method in which a control valve for controlling main actuators (for example, hydraulic cylinders and hydraulic motors) in the construction machine is remote-controlled by a hydraulic pressure (that is, a pilot pressure) controlled with a solenoid type pressure reducing valve unit described in Patent Document 1, for example.

In the solenoid type pressure reducing valve unit according to such a conventional art, a main spool receives a pilot pressure (controlled primary pressure) controlled in pressure in proportion to a supply electric current. As a result, the main spool is moved in an axial direction. The movement of the main spool causes communication and blocking between a primary pressure port and an output port, thus repeatedly performing the communication and blocking between the output port and a main drain passage (tank port). As a result, a pressure of the output port is controlled as a controlled secondary pressure to the controlled primary pressure in such a manner as to produce balance between a load (for example, a force that pushes the spool in one direction) by the controlled primary pressure (pilot pressure), and a load (for example a force that pushes the spool in the other direction) by the pressure of the output port and an urging force of a spring (elastic body such as a return spring).

PRIOR ART DOCUMENT

Patent Document

Patent Document 1: Japanese Utility Model No. 2538764

SUMMARY OF THE INVENTION

Incidentally, in the construction machine represented by the hydraulic excavator, a size of a control valve or a pipe for controlling the main actuator varies depending upon a size of a vehicle body. That is, there are some cases where, depending upon the vehicle body of a mounting object, components having a volume remarkably larger than a communication flow passage of the pilot pressure and a volume in a pilot pressure chamber or components low in wall surface rigidity such as a rubber hose are connected to the output port. In a case where this connection object (the above-mentioned component) is connected to the output port, the controlled secondary pressure of the output port is possibly delayed in response to a change in the controlled primary pressure (pilot pressure). Therefore, it becomes difficult to early bring out a balance between the load by the controlled primary pressure, the load by the pressure of the output port (control led secondary pressure) and the urging force of the spring, making it difficult to take out a stable pressure (controlled secondary pressure) from the output port.

That is, in the pressure reducing valve unit according to the conventional art, when the pilot pressure is controlled in proportion to the supply electric current, the pressure of the output port cannot follow in such a manner as to maintain a balance between the pilot pressure and the urging force of the spring. Therefore, vibrations are possibly generated in the main spool. In addition, the vibration of the main spool causes a volumetric variation in the pilot pressure chamber, which varies the pilot pressure. Further, the pressure of the output port has a delay to the pilot pressure. Therefore, in a case where the variation in the pilot pressure is generated, the balance between the load by the pilot pressure, the load by the pressure of the output port and the urging force of the spring cannot be still maintained, thus causing the main spool to continue to vibrate. That is, a self-excited vibration is generated in the main spool, and as a result, the pressure of the output port becomes unstable.

In this way, the solenoid type pressure reducing valve unit according to the conventional art has a problem that, in a case where the component large in the load volume or the component low in the wall surface rigidity is connected to the output port, the pressure of the output port is possibly delayed in response, causing the self-excited vibration to be generated in the main spool.

The present invention is made in view of the foregoing problems in this conventional art, and an object of the present invention is to provide a pressure reducing valve unit that can early stabilize a pressure of an output port varying in accordance with a pilot pressure to suppress a self-excited vibration of a spool.

For solving the aforementioned problems, the present invention is applied to a pressure reducing valve unit comprising: a housing that has a primary pressure port, a tank port and an output port and is provided with a spool hole formed to communicate with each of the ports; a closing part that closes the spool hole from an axial one side; a spool (24) that is inserted in the spool hole of the housing, the spool moving in an axial direction of the spool hole to communicate one port of the primary pressure port and the tank port with the output port and block the other port from the output port; a pilot pressure chamber that is positioned between an axial one side of the spool and the closing part and is formed in the housing; an elastic body that is positioned in an axial other side of the spool and is provided in the housing to urge the spool toward the axial one side; a first pressure receiving part that is provided in the spool for moving the spool toward the axial other side against the elastic body with a force in accordance with a pressure in the pilot pressure chamber and receives the pressure in the pilot pressure chamber; and a second pressure receiving part that is provided in the spool for moving the spool together with the elastic body toward the axial one side with a force in accordance with a pressure in the output port and receives the pressure in the output port.

In addition, the configuration adopted by the present invention is characterized in that the spool hole includes: a first annular groove that is communicated with the tank port; a second annular groove that is communicated with the output port; and a third annular groove that is communicated with the primary pressure port, the spool includes: a first land part that is arranged in a position for communication or blocking between the first annular groove and the second annular groove in the spool hole; and a second land part that is arranged in a position for communication or blocking between the second annular groove and the third annular groove in the spool hole, wherein a throttle passage is provided between the first land part of the spool and the spool hole to communicate the pilot pressure chamber with the tank port and limit a flow amount of hydraulic oil to be discharged to the tank port from the pilot pressure chamber due to movement of the spool to the axial other side along the spool hole, wherein in a state where the spool abuts on the closing part, a first distance as a distance between an end part of the throttle passage in the axial other side and an end surface of the first annular groove in the axial one side is set to be smaller than a second distance as a distance between an end surface of the second land part in the axial one side and an end surface of the third annular groove in the axial one side and a third distance as a distance between an end surface of the first land part in the axial other side and an end surface of the first annular groove in the axial other side.

As described above, according to present invention, the first distance is set to be smaller than the second distance and the third distance. Therefore, when the spool moves from the axial one side to the axial other side along the spool hole, the pilot pressure chamber and the tank port are communicated by the throttle passage before the output port is blocked from the tank port and is communicated with the primary pressure port. Accordingly, the pressure in the pilot pressure chamber can be suppressed from abruptly increasing before the primary pressure port is communicated with the output port to increase the pressure of the output port, thus gradually increasing the pressure in the pilot pressure chamber. Therefore, it is possible to suppress a difference between the load by the pilot pressure and the load by the pressure of the output port from being made large at a point where the pressure of the output port starts to increase.

Accordingly, even in a case where the component large in the load volume that causes the response of the pressure of the output port to be delayed, the component low in the wall surface rigidity and the like is connected to the output port, the pressure of the output port can catch up with the change of the pressure in the pilot pressure chamber to keep the balance and to suppress the self-excited vibration in the main spool, Therefore, according to the pressure reducing valve unit by the present invention, even in a case where the component having the large volume or the component low in the wall surface rigidity is connected to the output port, the stable pressure can be taken out from the output port.

BRIEF DESCRIPTION OF THE DRAWINGS

FIG. 15 is a longitudinal sectional view showing a spool valve device in a pressure reducing valve unit at a non-operating time according to a modification.

MODE FOR CARRYING OUT THE INVENTION

Hereinafter, an explanation will be in detail made of a pressure reducing valve unit according to embodiments in the present invention with reference to the accompanying drawings, by taking a case of being applied to a hydraulic circuit for driving a hydraulic cylinder that is mounted on a hydraulic excavator sized to be larger than a standard machine (intermediate-sized machine), as an example.

Figure 1:
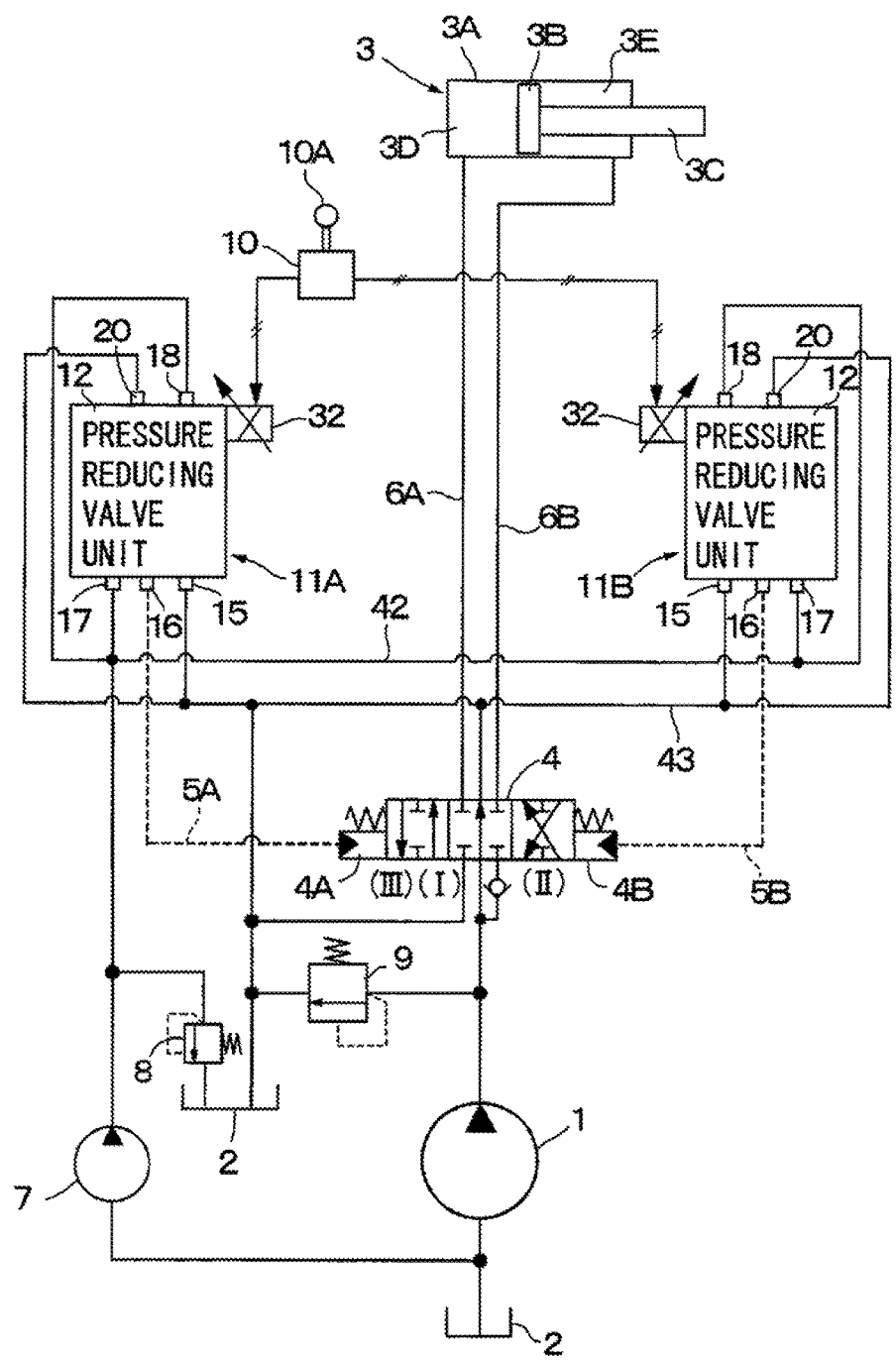
FIG. 1 is a hydraulic circuit diagram for a hydraulic cylinder drive to which a pressure reducing valve unit according to a first embodiment is applied.

Here, FIG. 1 to FIG. 6 show a first embodiment of the present invention. In FIG. 1, a hydraulic pump 1 configures a main hydraulic source together with a tank 2. The main hydraulic pump 1 is driven/rotated by a prime mover (not shown) of a large-sized hydraulic excavator, for example, and delivers hydraulic oil sucked in from the inside of the tank 2 as pressurized oil having a high pressure.

A hydraulic cylinder 3 for working shows a representative example of hydraulic actuators. The hydraulic cylinder 3 includes a boom cylinder, an arm cylinder, a bucket cylinder and the like (any of them is not shown), which are arranged, for example, on a working mechanism in the hydraulic excavator. The hydraulic cylinder 3 is configured of a tube 3A, a piston 3B, a rod 3C and the like. Particularly, the hydraulic cylinder 3 that is used for a large-sized hydraulic excavator has a large cylinder diameter, and a pressurized oil amount (hydraulic oil amount) for suction/delivery from the hydraulic pump 1 to the hydraulic cylinder 3 becomes a large flow amount.

In the hydraulic cylinder 3, the tube 3A is defined by the piston 3B to be composed of two oil chambers 3D, 3E therein, and a base end side of the rod 3C is fixed to the piston 3B. A tip end side of the rod 3C project a outside of the tube 3A, and the hydraulic cylinder 3 is extended/contracted by the pressurized oil for suction/delivery to the oil chambers 3D, 3E in the tube 3A from the hydraulic pump 1. It should be noted that the hydraulic actuator is not limited to the hydraulic cylinder, but may be a hydraulic motor for revolving or traveling of a hydraulic excavator, for example.

A directional control valve 4 is a control valve for the hydraulic cylinder 3, and is provided between the hydraulic pump 1, the tank 2 and the hydraulic cylinder 3. The directional control valve 4 is composed of a hydraulic pilot type directional control valve having six ports and three positions for example, and is provided with hydraulic pilot parts 4A, 4B in both of the left and right sides. The hydraulic pilot parts 4A, 4B of the directional control valve 4 are connected via pilot lines 5A, 5B to pressure reducing valve units 11A, 11B to be described later.

Particularly, the directional control valve 4 that is used in the large-sized hydraulic excavator is configured of the large-sized control valve (directional control valve) corresponding to the hydraulic cylinder 3 with a large cylinder diameter. Therefore, the directional control valve 4 is required to increase a flow amount of a pilot pressure (that is, a controlled secondary pressure to be described later) to be supplied to the hydraulic pilot parts 4A, 4B from the pressure reducing valve units 11A, 11B as described later.

The directional control valve 4 is switched to any of switching positions (II), (III) from a neutral position (I) in response to supply of the pilot pressure to the hydraulic pilot parts 4A, 4B from the pressure reducing valve units 11A, 11B. Thereby, the pressurized oil from the hydraulic pump 1 is delivered to/suctioned from the oil chambers 3D, 3E of the hydraulic cylinder 3 via a pair of main lines 6A, 6B, and the rod 3C of the hydraulic cylinder 3 is extended (driven) from the tube 3A. At this time, a flow amount of the pressurized oil to be delivered to/suctioned from the oil chambers 3D, 3E in the hydraulic cylinder 3 is variably controlled in accordance with a stroke mount (that is, a tilting control amount of a control lever 10A to be described later) of the directional control valve 4.

A pilot pump 7 configures a pilot hydraulic source together with the tank 2. The pilot pump 7 is driven/rotated together with the main hydraulic pump 1 by the prime mover. A delivery side of the pilot pump 7 is provided with a low-pressure relief valve 8 between the tank 2 and the pilot pump 7. The low-pressure relief valve 8 is to suppress a delivery pressure of the pilot pump 7 to be equal to or less than a predetermined relief setting pressure. A pilot pressure generated by the pilot pump 7 is delivered to first and second pump ports 17, 18 of the pressure reducing valve unit 11A and first and second pump ports 17, 18 of the pressure reducing valve unit 11B respectively via a control pressure line 42 to be described later.

A high-pressure relief valve 9 is provided between a delivery line 1A of the main hydraulic pump 1 and the tank 2. The high-pressure relief valve 9 suppresses a delivery pressure of the hydraulic pump 1 to be equal to or less than a predetermined relief setting pressure for preventing generation of an excessive pressure in the hydraulic pump 1. The relief setting pressure is set to a pressure sufficiently higher than that of a low-pressure relief valve 8.

The control lever device 10 is an electrical type control device, and is configured as an electrical lever device for remote-controlling the movement of the hydraulic cylinder 3. The control lever device 10 has the control lever 10A that is tiltably controlled manually by an operator of the hydraulic excavator. The control lever device 10 outputs a control signal in accordance with a control direction and a control amount of the control lever 10A to the solenoid type pressure reducing valve units 11A, 11B respectively.

Here, the control lever device 10 is disposed in the cab (not shown) configuring part of an operator's room of the hydraulic excavator. On the other hand, the solenoid type pressure reducing valve units 11A, 11B are arranged in a position largely away from the cab (for example, a position near the directional control valve 4). That is, since the control lever device 10 is the electrical type control device, the control lever device 10 is only connected to the pressure reducing valve units 11A, 11B by electrical wires (signal lines), and a distance therebetween can be extended to more than several meters as needed. It should be noted that in a case of using a pilot hydraulic pipe (that is, in a case of using not the electrical lever device, but a pilot control valve of a pressure reducing valve type), a pipe length is generally limited to one meter or less, for example.

The solenoid type pressure reducing valve units 11A, 11B each supplies a pilot pressure in response to (in proportion to) a control signal (that is, a control electric current) from the control lever device 10 to the pilot lines 5A, 5B. The directional control valve 4 is switched to any of switching positions (II), (III) from a neutral position (I) in response to supply of the pilot pressure (controlled secondary pressure to be described later) at this time to the hydraulic pilot parts 4A, 4B. Therefore, the pressurized oil from the hydraulic pump 1 is delivered to/suctioned from the oil chambers 3D, 3E of the hydraulic cylinder 3 via the pair of main lines 6A, 6B, and the rod 3C of the hydraulic cylinder 3 is extended/contracted (driven). In this way, the expanding and contracting movement of the hydraulic cylinder 3 is remote-controlled by the control lever device 10 via the solenoid type pressure reducing valve units 11A, 11B and the directional control valve 4.

Next, an explanation will be made of a specific configuration of the solenoid type pressure reducing valve units 11A, 11B with reference to FIG. 2 to FIG. 4. It should be noted that the pressure reducing valve units 11A, 11B each have a substantially similar configuration, and therefore in the following explanation, the pressure reducing valve unit 11B will be explained as an example, and an explanation of the pressure reducing valve unit 11A is omitted.

Figure 2:
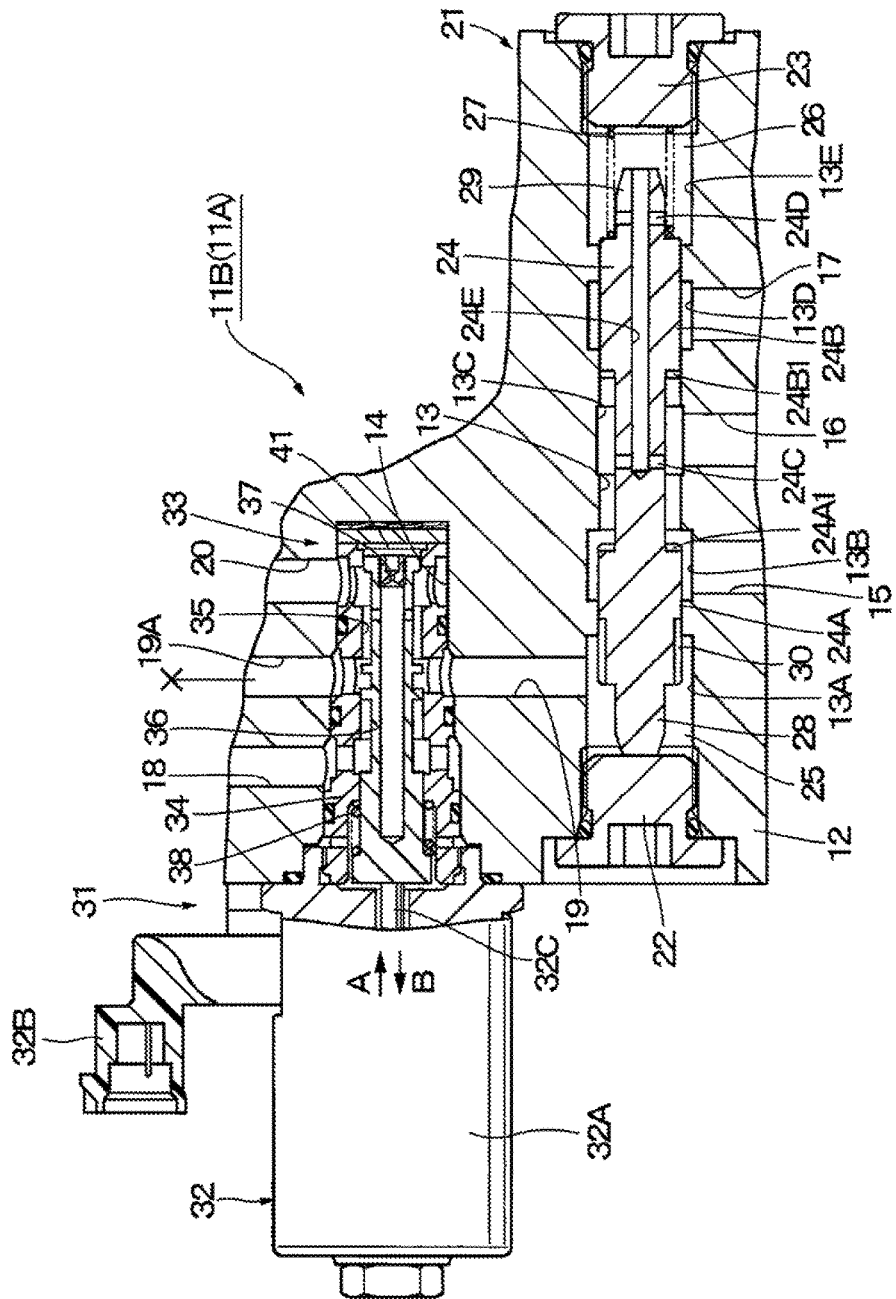
FIG. 2 is an enlarged longitudinal sectional view in a non-operating state showing the pressure reducing valve unit in FIG. 1.

As shown in FIG. 2, the pressure reducing valve unit 11B includes a housing 12 forming an outer shell thereof, and a spool valve device 21 and a solenoid valve device 31 that are provided in the housing 12. The spool valve device 21 configures a flow amount increasing device (that is, a booster) that increases a flow amount of a controlled primary pressure (pilot pressure) to be generated by the solenoid valve device 31 in response to a control signal (that is, a control electric current) from the control lever device 10.

The spool valve device 21 supplies the controlled secondary pressure (output port pressure) increasing the flow amount of the controlled primary pressure by the solenoid valve device 31 to the hydraulic pilot part 4B of the directional control valve 4 as the pilot pressure. That is, the directional control valve 4 mounted on the large-sized hydraulic excavator is configured of a large-sized control valve corresponding to the hydraulic cylinder 3 having a large cylinder diameter. Therefore, the directional control valve 4 is required to increase the flow amount of the pilot pressure (that is, the controlled secondary pressure) to be supplied to each of the hydraulic pilot parts 4A, 4B from the pressure reducing valve units 11A, 11B, The spool valve device 21 is used as such a flow amount increasing device.

In each of the solenoid type pressure reducing valve units 11A, 11B, a pressure in a controlled primary pressure flow passage 19 to be described later and in a pilot pressure chamber 25 (that is, a pilot pressure as the controlled primary pressure) is variably controlled by the solenoid valve device 31. In the spool valve device 21, the main spool 24 is slidingly displaced (driven) to an axial other side by the controlled primary pressure, and accordingly the pressure (controlled secondary pressure) of the output port 16 is variably controlled.

A main spool insertion hole 13 and a solenoid valve cartridge insertion hole 14 are provided in the housing 12 of the pressure reducing valve unit 11B to extend in parallel with each other. The main spool insertion hole 13 configures a spool hole forming a part of the spool valve device 21, The solenoid valve cartridge insertion hole 14 configures a part of the solenoid valve device 31. The solenoid valve cartridge insertion hole 14 has an axial one end that opens to an end surface of the housing 12 and an axial other side that is formed as a closed, bottomed, stepped hole.

The main spool insertion hole 13 is formed as a stepped hole extending through between an axial one side and an axial other side of the housing 12, The main spool insertion hole 13 is provided with annular grooves 13A, 13B, 13C, 13D, 13E formed as enlarged-diameter holes on the peripheral wall surface side. The annular grooves 13A to 13E are arranged to be spaced from each other in an axial direction of the main spool insertion hole 13. The main spool insertion hole 13 has an open end side of the annular groove 13A positioned in an axial one side out of the annular grooves 13A to 13E that is closed to be removable by a closing part (for example, a closing plug 22 to be described later) and an open end side of the annular groove 13E positioned in the axial other side that is removably closed by a closing plug 23 to be described later.

Moreover, the housing 12 is provided with a first tank port 15, an output port 16 and a primary pressure port (hereinafter, referred to as "first pump port 17"), which are spaced from each other in the axial direction of the main spool insertion hole 13. These ports 15, 16, 17 are communicated with each other via the main spool insertion hole 13. The output port 16 is formed as an oil hole extending radially outward from a peripheral surface of the annular groove 13C positioned in the intermediate part of annular grooves 13A to 13E. The output port 16 is connected respectively to the hydraulic pilot parts 4A, 4B of the directional control valve 4 via the pilot lines 5A, 5B.

The first tank port 15 is formed as an oil hole extending radially outward from a peripheral surface of the annular groove 13B positioned between the annular groove 13A and the annular groove 13C. The first tank port 15 is connected to the tank 2 via a later-described tank line 43 (refer to FIG. 1). The first pump port 17 is formed as an oil hole extending radially outward from a peripheral surface of the annular groove 13D positioned between the annular groove 13C and the annular groove 13E. The first pump port 17 is connected to the pilot pump 7 via a later-described control pressure line 42 (refer to FIG. 1) and is formed as a primary pressure port.

In other words, the main spool insertion hole 13 as the spool hole includes the annular groove 13B as a first annular groove communicated with the tank port 15, the annular groove 13C as a second annular groove communicated with the output port 16 and the annular groove 13D as a third annular groove communicated with the first pump port 17.

Further, the housing 12 is provided with a second pump port 18, the controlled primary pressure flow passage 19 and a second tank port 20, which are spaced from each other in the axial direction of the solenoid valve cartridge insertion hole 14. These ports 18, 20 and the controlled primary pressure flow passage 19 are composed of oil holes respectively extending in a radial direction of the solenoid valve cartridge insertion hole 14, and are communicated with each other via the solenoid valve cartridge insertion hole 14.

Here, the controlled primary pressure flow passage 19 is formed as an oil hole extending radially outward from a peripheral surface of the annular groove 13A of the main spool insertion hole 13. The controlled primary pressure flow passage 19 has a hole part 19A extending toward the radial opposite side across the solenoid valve cartridge insertion hole 14. However, the hole part 19A is a dummy hole formed upon processing the controlled primary pressure flow passage 19, and is closed to an exterior using a plug (not shown) and the like. It should be noted that, for example, a pressure sensor (not shown) that detects a pressure in the pilot pressure chamber 25, and the like may be disposed in the hole part 19A. In this case, the pressure in the pilot pressure chamber 25 is detected by the pressure sensor, making it possible to perform a feedback control to the pressure of the output port 16.

The spool valve device 21 is configured to include the closing plugs 22, 23 that respectively close both end sides of the main spool insertion hole 13, the main spool 24 as a spool that is slidably positioned between the closing plugs 22, 23 and is inserted in the main spool insertion hole 13, the pilot pressure chamber 25 that is positioned between an axial one side (later-described land 24A) of the main spool 24 and the closing plug 22 and is formed in the housing 12 (annular groove 13A of the main spool insertion hole 13), a feedback pressure chamber 26 that is positioned between the axial other side of the main spool 24 and the closing plug 23 and is formed in the housing 12 (annular groove 13E of the main spool insertion hole 13), and a first return spring 27 as an elastic body that regularly urges the main spool 24 toward the axial one side, the first return spring 27 being positioned in the feedback pressure chamber 26 and being provided between the axial other side (later-described land 24B) of the main spool 24 and the closing plug 23.

Figure 3:
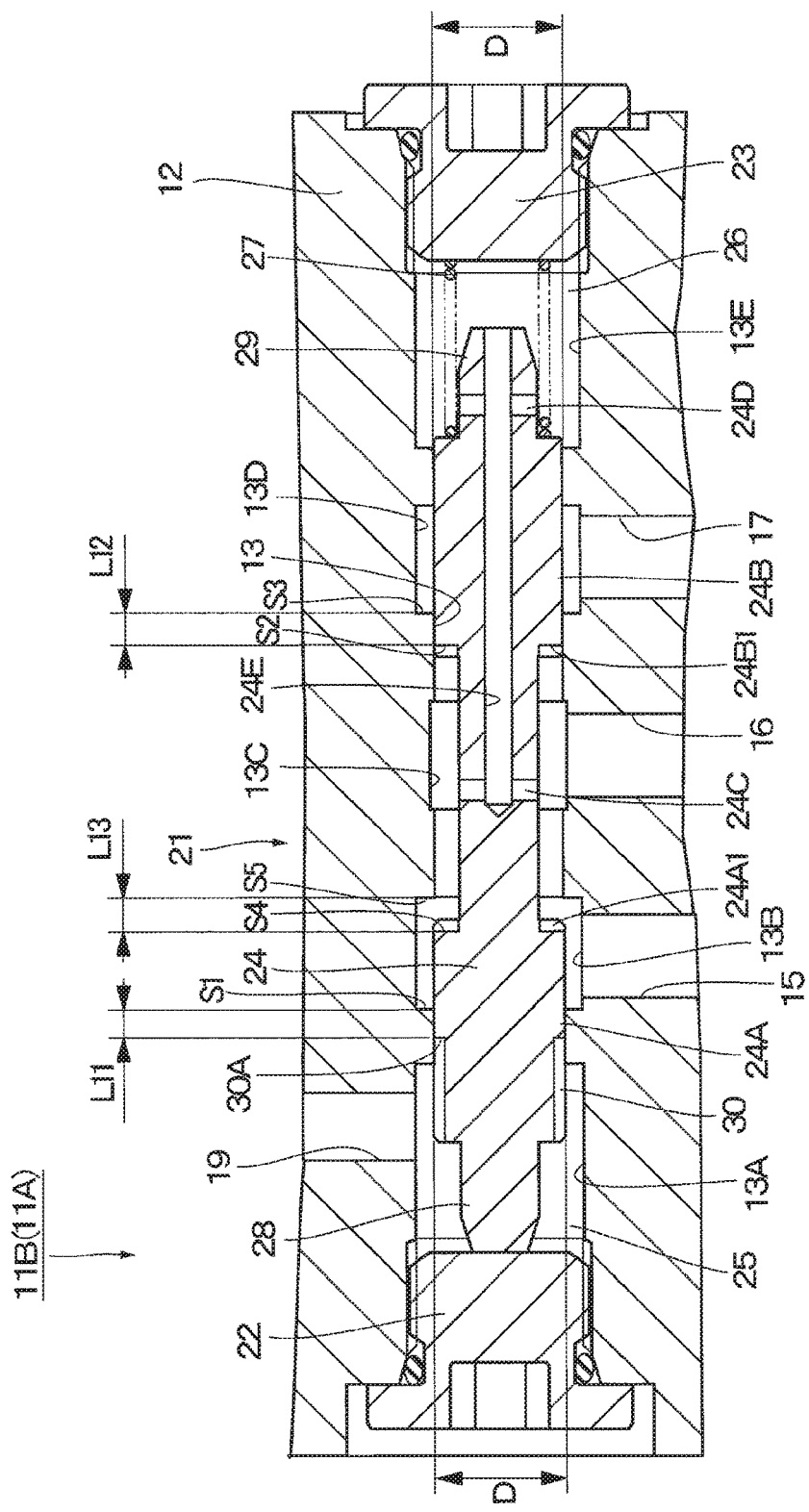
FIG. 3 is an enlarged longitudinal sectional view in a non-operating state showing a spool valve device in FIG. 2.

As shown in FIG. 2 and FIG. 3, in an initial state (that is, in a non-operating state) where the pressure (controlled primary pressure) in the pilot pressure chamber 25 is low, the main spool 24 is urged toward the axial one side by the first return spring 27 to be returned back to a waiting position. Therefore, the main spool 24 is provided with an end surface in the axial one end (that is, a first pressure receiving part 28) that abuts on the closing plug 22 and waits until the next control time of the control lever device 10 in this state.

The main spool 24 has two lands 24A, 24B (that is, the one side land 24A and the other side land 24B) on the outer peripheral side, and the one side land 24A and the other side land 24B are arranged to be spaced from each other in the axial direction of the main spool 24. The one side land 24A is arranged in a position in such a manner that the one end of the axial direction establishes the blocking or the communication between the annular grooves 13A, 13B of the main spool insertion hole 13 through a throttle passage 30, and the axial other side establishes the blocking or the communication between the annular grooves 13B, 13C.

The other side land 24B is arranged in a position in such a manner that the axial one end of the axial direction establishes the blocking or the communication between the annular grooves 13C, 13D of the main spool insertion hole 13, and the axial other side establishes the blocking between the annular grooves 13D, 13E all the time. Therefore, the blocking or the communication between the first tank port 15 and the output port 16 of the housing 12 is established by the one side land 24A of the main spool 24. The blocking or the communication between the output port 16 and the first pump port 17 is established by the other side land 24B of the main spool 24.

The one side land 24A of the spool 24 configures a first land part that is disposed in a position of establishing the blocking or the communication between the first annular groove 13B and the second annular groove 13C in the spool hole 13. The other side land 24B of the spool 24 configures a second land part that is disposed in a position of establishing the blocking or the communication between the second annular groove 13C and the third annular groove 13D.

The one side land 24A of the main spool 24 is provided with one or plural notches 24A1 on an end surface thereof in the axial other-side exposed to the inside of the annular groove 13B. The notch 24A1 is formed in a notch shape composed of a U notch, a V notch or a K notch, for example. The notch 24A1 has a function of suppressing a passage area from abruptly changing at the time of establishing communication or blocking between the first tank port 15 and the output port 16 by the one side land 24A to create a gradual change in passage area.

Moreover, the other side land 24B is provided with one or plural notches 24B1 on an end surface thereof in the axial one side positioned in the annular groove 13C-side. The notch 24B1 is formed in a notch shape as similar to the notch 24A1, and has a function of controlling a passage area from abruptly changing at the time of suppressing communication or blocking between the output port 16 and the first pump port 17 by the other side land 24B to create a gradual change in passage area.

An axial intermediate part of the main spool 24 is provided with a radial through hole 24C formed in a position of communicating with the output port 16 through the annular groove 13C all the time. The axial other side of the main spool 24 is provided with a radial through hole 24D formed in a position of communicating with the feedback pressure chamber 26 (the annular groove 13E) all the time. In addition, the main spool 24 is provided therein with a communicating hole 24E for establishing communication between the through holes 24C, 24D, and the communicating hole 24E opens to an end surface of the main spool 24 in the axial other side to be communicated with the feedback pressure chamber 26 all the time. As a result, the feedback pressure chamber 26 is all the time communicated with the output port 16 through the communicating hole 24E and the through holes 24C, 24D to be held in a pressure state equal to that in the output port 16.

The first pressure receiving part 28 is provided in the axial one side of the main spool 24 including the axial end surface of the one side land 24A. The first pressure receiving part 28 acts as a pressure receiving surface having a diameter of D (refer to FIG. 3) that receives a pressure in the pilot pressure chamber 25 to move the main spool 24 to the axial other side against the first return spring 27. As a result, a load of a hydraulic force F1 (refer to FIG. 5) in accordance with the pressure (that is, the controlled primary pressure) in the pilot pressure chamber 25 is added on the main spool 24 toward the side of the feedback pressure chamber 26 positioned in the axial other side.

A second pressure receiving part 29 receives the pressure of the output port 16 to move the main spool 24 to the axial one side with a load in accordance with the pressure of the output port 16 together with the first return spring 27. Here, the second pressure receiving part 29 is provided in the axial other side of the main spool 24 including the axial end surface of the other side land 24B. The second pressure receiving part 29 acts as a pressure receiving surface having a diameter of D (refer to FIG. 3) that receives a pressure in the feedback pressure chamber 26 (that is, the output port 16 through the communicating hole 24E and the like). Thereby, a load for pushing back the main spool 24 to the one side by a hydraulic force F2 (refer to FIG. 5) in accordance with the pressure of the output port 16 together with the first return spring 27 is added to the main spool 24.

In other words, the main spool 24 is provided with the first pressure receiving part 28 that receives the controlled primary pressure in the pilot pressure chamber 25 with the diameter of D to receive the hydraulic force F1 (the load by the controlled primary pressure) toward the axial other side. In addition, the main spool 24 is provided with the second pressure receiving part 29 that receives the controlled secondary pressure (pressure of the output port) in the feedback pressure chamber 26 with the diameter of D equal to that of the first pressure receiving part 28 to generate the hydraulic force F2 (the load by the controlled secondary pressure) toward the axial one side. Further, the main spool 24 regularly receives an urging force f (refer to FIG. 5) toward the axial one side by the first return spring 27.

The throttle passage 30 is arranged between the main spool insertion hole 13 of the housing 12 and the one side land 24A of the main spool 24. The throttle passage 30 is configured by forming a plurality of notch grooves (that is, notch grooves that axially expend and are spaced in a circumferential direction) in a part of the one side land 24A in the main spool 24 closer to the axial one side, for example. The throttle passage 30 communicates the pilot pressure chamber 25 with the annular groove 13B (first tank port 15) following the movement of the main spool 24 to the axial other side along the main spool insertion hole 13. In this state, the throttle passage 30 is configured to limit a flow amount of the hydraulic oil to be discharged to the first tank port 15 through the inside of the annular groove 13B from the pilot pressure chamber 25.

As shown in FIG. 3, the throttle passage 30 has the axial one side that opens to the inside of the pilot pressure chamber 25 and the axial other side that is formed as an end edge 30A closed in an axial midway position of the one side land 24A. When the main spool 24 is in the waiting position (initial position), the end edge 30A of the throttle passage 30 is arranged in a position of being spaced by a dimension L11 as a first distance from an axial one-side end surface of the annular groove 13B. At this time, an axial one-side end surface (in more detail, a bottom surface of the notch 24B1) of the other side land 24B is arranged in a position of being spaced by a dimension L12 as a second distance from an axial one-side end surface of the annular groove 13D. An axial other-side end surface (in more detail, a bottom surface of the notch 24A1) of the one side land 24A is arranged in a position of being spaced by a dimension L13 as a third distance from an axial other-side end surface of the annular groove 13B.

Here, the dimensions L11, L12, L13 (and the dimensions L21, L31, L22, L32, L23, L33, discussed infra as well) are set to a relationship in which the dimension L11 is smaller than the dimension L12 (L11<L12) and the dimension L11 is smaller than the dimension L13 (L11<L13). That is, in a state where the spool 24 abuts on the closing plug 22, the first distance (dimension L11, L21, L31) as a distance between an end part (30A, 51B) of the throttle passage 30, 51 in the axial other side and an end surface (S1) of the first annular groove (13B, 61B, 71B) in the axial one side is set to be smaller than the second distance (dimension L12, L22, L32) as a distance between an end surface (S2) of the second land part 24B (the other side land 24B) in the axial one side and an end surface (S3) of the third annular groove (13D, 61D, 71D) in the axial one side and the third distance (dimension L13 L23, L33) as a distance between an end surface (S4) of the first land part (one side land 24A) in the axial other side and an end surface (S5) of the first annular groove (13B, 61B, 71B) in the axial other side. The above relationship is expressed by the following formula 1.

$$L11<L12, L13 \qquad \text{[Formula 1]}$$

Therefore, when the main spool 24 moves from the waiting position (initial state) where the end part of the main spool 24 in the axial one side (that is, the tip end part of the first pressure receiving part 28) abuts on the closing plug 22 to the axial other side (feedback pressure chamber 26-side), the pilot pressure chamber 25 and the first tank port 15 are first communicated through the throttle passage 30. After that, the output port 16 is communicated with the first pump port 17, and the first tank port 15 is blocked from the output port 16.

In other words, when the main spool 24 moves from the waiting position to the axial other side along the main spool insertion hole 13, the throttle passage 30 is configured to communicate the pilot pressure chamber 25 with the first tank port 15 before a state where the first pump port 17 (primary pressure port) is communicated with the output port 16 and a state where the first tank port 15 is blocked from the output port 16.

Next, an explanation will be made of the solenoid valve device 31 that variably controls the controlled primary pressure (pilot pressure) to be supplied to (generated in) the pilot pressure chamber 25 of the spool valve device 21 based upon the control signal (that is, the control electric current) from the control lever device 10 with reference to FIG. 4.

The solenoid valve device 31 is configured to include, for example, a solenoid actuator 32 formed of an electromagnetic proportional solenoid, and an electromagnetically operated type pressure control valve 33 that is controlled/switched through a push rod 32C by the solenoid actuator 32. The solenoid actuator 32 includes an actuator case 32A forming an outer shell, a connector part 32B that is provided integrally with the actuator case 32A and is connected to the control lever device 10 (refer to FIG. 1) via signal lines and the like, the push rod 32C that is provided to be capable of displacing in the actuator case 32A, and a solenoid (not shown) that is provided in the actuator case 32A and drives the push rod 32C axially (a direction of arrow A or arrow B in FIG. 2 and FIG. 4).

Figure 4:
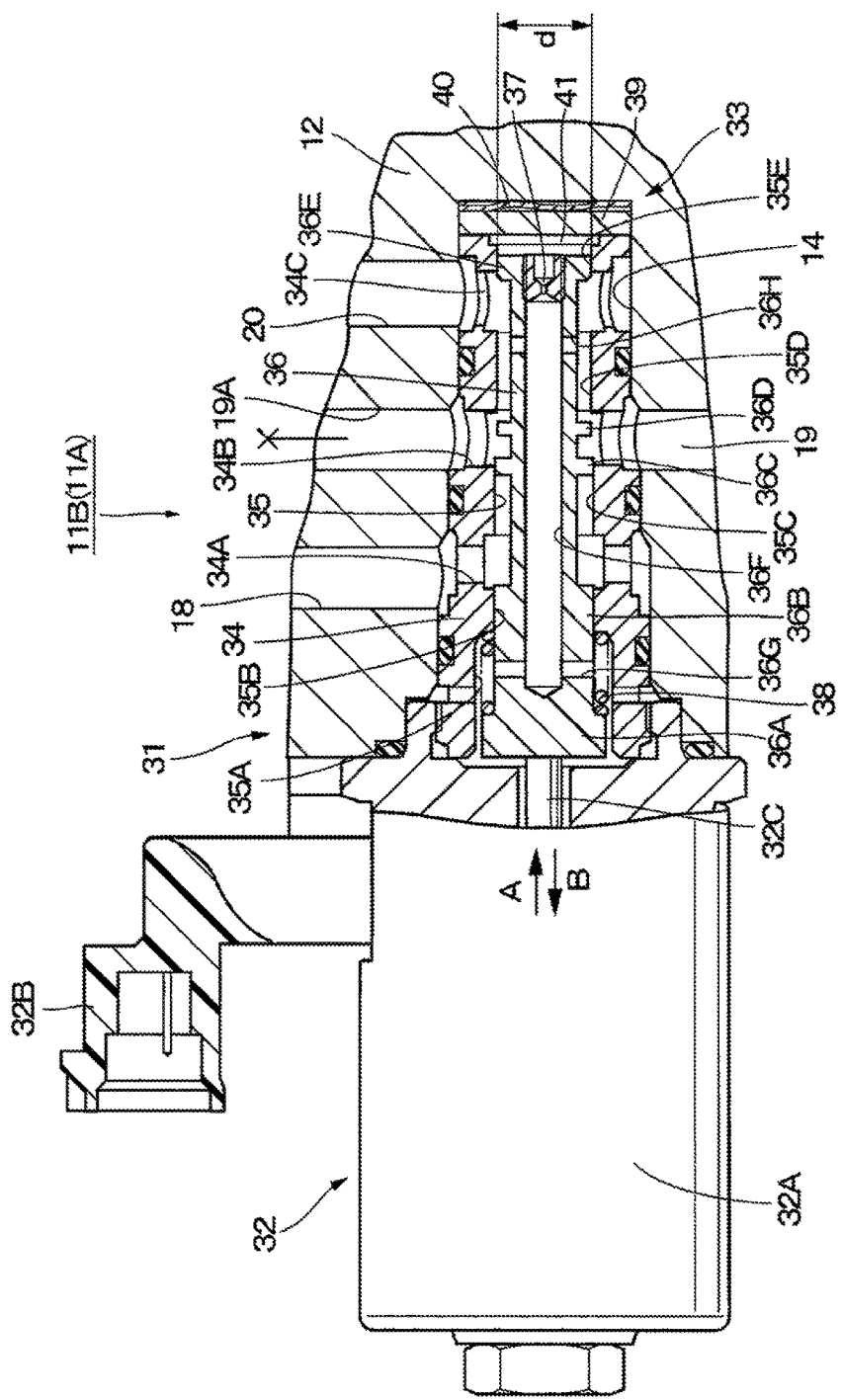
FIG. 4 is an enlarged longitudinal sectional view at a non-operating time illustrating a solenoid valve device in FIG. 2.

As shown in FIG. 1, a control signal (that is, a control electric current) from the control lever device 10 is input to the solenoid actuator 32 via the connector part 32B, and the push rod 32C is driven to extend in the direction of arrow A in FIG. 2 and FIG. 4 from the actuator case 32A in accordance with (for example, in proportion to) an electric current value at this time. When the push rod 32C is subjected to a load (force in a direction of arrow B) surpassing an electromagnetic force of the solenoid from a later-described pilot spool 36, the push rod 32C can move in a direction (that is, the direction of arrow B) opposing the above direction of arrow A.

That is, the push rod 32C of the solenoid actuator 32 is always urged to the pilot spool 36-side (direction of arrow A) by a spring (not shown) in the solenoid side provided in the actuator case 32A with a force smaller than a later-described second return spring 38. Therefore, the spring in the solenoid side is elastically deflected, thereby making it possible for the push rod 32C to move in the direction of arrow 3 with the load. In addition, when the control lever 10A is back to the neutral position and the control signal from the control lever device 10 becomes an electric current value of zero, the push rod 32C of the solenoid actuator 32 is returned back to the most contracted position as shown in FIG. 2 and FIG. 4.

The pressure control valve 33 in the solenoid valve device 31 is provided to be fitted into the solenoid valve cartridge insertion hole 14, and includes a sleeve 34 that is arranged to be coaxial with the push rod 32C of the solenoid actuator 32, and the pilot spool 36 that is provided to be inserted/fitted in a stepped hole 35 formed on an inner peripheral side of the sleeve 34.

The sleeve 34 of the pressure control valve 33 is provided for the other opening of the actuator case 32A of the solenoid actuator 32 to be screwed onto the outer periphery in the axial one side of the sleeve 34. Therefore, the solenoid valve device 31 has the cartridge structure in which the solenoid actuator 32, the sleeve 34 of the pressure control valve 33, the pilot spool 36 and the second return spring 38 are preassembled in a sub-assembled state. In this state, the sleeve 34 is attached to be pushed into the solenoid valve cartridge insertion hole 14 of the housing 12 together with the pilot spool 36 and the second return spring 38 from the axial one side to the axial other side. As a result, the end surface of the sleeve 34 in the axial other side abuts on the bottom side of the solenoid valve cartridge insertion hole 14 through a partition plate 39 and a spring member 40, which will be described later.

In other words, the actuator case 32A of the solenoid actuator 32 is provided to be fixed in the housing 12 to close the solenoid valve cartridge insertion hole 14 of the housing 12 and a spring accommodating hole part 35A of the sleeve 34 from the axial one side.

Radial oil passage holes 34A, 34B, 34C communicated, with the inside of the stepped hole 35 are provided in the sleeve 34 to be axially spaced from each other. Out of the those, the oil passage hole 34A positioned closer to the axial one side of the sleeve 34 is regularly communicated with the second pump port 18 of the housing 12. The oil passage hole 34B positioned in the axial intermediate part is regularly communicated with the controlled primary pressure flow passage 19. The oil passage hole 34C positioned closer to the axial other side of the sleeve 34 is regularly communicated with the second tank port 20. The oil passage holes 34A, 34B, 34C are sealed from each other on the outer peripheral side of the sleeve 34 by O-rings and the like.

The stepped hole 35 formed on the inner peripheral side of the sleeve 34 includes the spring accommodating hole part 35A positioned in the axial one side (opening end side), and sliding bore parts 35B to 35E formed to be smaller in diameter than the spring accommodating hole part 35A. The spring accommodating hole part 35A of the stepped hole 35 is formed as a diameter-enlarged hole having an inner diameter larger than that of the sliding bore part 35B positioned the closest to the axial one side among the sliding bore parts 35B to 35E of the stepped hole 35. An end part (end part in the axial one side) of the spring accommodating hole part 35A is formed as an opening end that is communicated with (opens to) the inside of the other side opening of the actuator case 32A in one side of the housing 12.

The stepped hole 35 is a spool sliding hole formed on the inner peripheral side of the sleeve 34, and includes the plurality of sliding bore parts 35B, 35C, 35D, 35E for insertion of the pilot spool 36. The sliding bore parts 35B, 35C, 35D, 35E each are formed to have an inner diameter dimension that is made to be gradually smaller from the axial one side to the axial other side of the sleeve 34. Among them, the sliding bore parts 35B, 35C may be formed to have the same diameter with each other and are only required to have a diameter larger than the sliding bore parts 35D, 35E. The sliding bore parts 35D, 35E may fee formed to have the same diameter with each other as long as the sliding bore parts 35D, 35E each have a diameter smaller than the sliding bore parts 35B, 35C.

The pilot spool 36 is axially inserted/fitted into the stepped hole 35 of the sleeve 34. In this state, the pilot spool 30 is attached such that a boss part 36A as a closing end in the axial one side regularly abuts on the push rod 32C of the solenoid actuator 32. The pilot spool 36 axially moves (slidingly displaces) in the inside of the stepped hole 35 following extension in the direction of arrow A in FIG. 4 or contraction in the direction of arrow B in FIG. 4 of the push rod 32C from or to the actuator case 32A.

The pilot spool 36 is provided with four lands 36B, 36C, 36D, 36E on the outer peripheral side that are axially spaced from each other. Among them, the one side land 36B positioned in the boss part 36A-side (the closest to the axial one side) is formed to be larger in diameter than the other side land 36E positioned in the tip end side (the closest to the axial other side) of the pilot spool 36. The intermediate lands 36C, 36D positioned between the one side land 36B and the other side land 36E are formed as an annular flange part, and an outer diameter dimension of the one intermediate land 36C is formed to be larger in diameter than that of the other intermediate land 36D. The one side land 36B and the large-diameter side intermediate land 36C may be formed to have the same diameter with each other. In addition, the small-diameter side intermediate land 36D and the other side land 36E may be formed to have the same diameter with each other.

In a state where the pilot spool 36 is inserted/fitted in the sleeve 34 (stepped hole 35), the one side land 36B is arranged to slidingly displace in the axial direction in the inside of the sliding bore part 35B, and the other side land 36E is arranged to slidingly displace in the inside of the sliding bore part 35E. The large-diameter side intermediate land 36C out of the intermediate lands 36C, 36D is arranged to slidingly displace in the inside of the sliding bore part 35C. On the other hand, the small-diameter side intermediate land 36D is arranged in a position of communicating the oil passage hole 34B with the sliding bore part 35D. When the large-diameter side intermediate land 36C moves (advances) to a position of the oil passage hole 34B from the sliding bore part 35C, the sliding bore part 35C (second pump port 18) is communicated with the controlled primary pressure flow passage 19 through the oil passage hole 34B. At this time, the small-diameter side intermediate land 36D becomes in a state of being inserted/fitted to be capable of sliding in the sliding bore part 35D to block the oil passage hole 34B (controlled primary pressure flow passage 19) to the second tank port 20 (sliding bore part 35D).

In this way, the large-diameter side intermediate land 36C is a land that is provided in the pilot spool 36 for establishing the blocking and communication between the second pump port 18 and the controlled primary pressure flow passage 19. On the other hand, the small-diameter side intermediate land 36D is a land that is provided in the pilot spool 36 for establishing the blocking and communication between the second tank port 20 and the controlled primary pressure flow passage 19.

That is, the pilot spool 36 establishes the blocking between the oil passage holes 34A, 34B (between the second pump port 18 and the controlled primary pressure flow passage 19) in a state where the large-diameter side intermediate land 36C is arranged in (is in sliding contact with) the sliding bore part 35C of the sleeve 34. However, the pilot spool 36 moves to the axial other side (in a direction of arrow A in FIG. 4), and when the large-diameter side intermediate land 36C goes into a position of the oil passage hole 34B from the sliding bore part 35C, the communication between the oil passage holes 34A, 34B (between the second pump port 18 and the controlled primary pressure flow passage 19) is established. Therefore, hydraulic oil supplied from the control pressure line 42 (second pump port 13) as shown in FIG. 1 flows in a space between the sleeve 34 and the pilot spool 36, and is introduced into the pilot pressure chamber 25 through the controlled primary pressure flow passage 19 from the oil passage hole 34B.

At this time, the small-diameter side intermediate land 36D is inserted in (is in sliding contact with) the sliding bore part 35D of the sleeve 34 to establish the blocking between the oil passage holes 34B, 34C (between the controlled primary pressure flow passage 19 and the second tank port 20). Therefore, the hydraulic oil does not flow toward the second tank port 20 from the controlled primary pressure flow passage 19. However, the pilot spool 36 is returned back to the axial one side (in a direction of arrow B in FIG. 4), and when the small-diameter side intermediate land 36D goes into a position of the oil passage hole 34B from the sliding bore part 35D (that is, in a state shown in FIG. 4), the communication between the oil passage holes 34B, 34C (between the controlled primary pressure flow passage 19 and the second tank port 20) is established. Therefore, the hydraulic oil supplied to the pilot pressure chamber 25 flows into the oil passage hole 34B through the controlled primary pressure flow passage 19, then in a space between the sleeve 34 and the pilot spool 36, and returns back to the tank line 43 (refer to FIG. 1) from the second tank port 20.

Here, the end surface of the large-diameter side intermediate land 36C in the axial one side has a pressure receiving area that is equal to that of the end surface of the one side land 36B in the axial other side. Accordingly, a hydraulic force in the direction of arrow B is generated in the large-diameter side intermediate land 36C. On the other hand, the end surface of the small-diameter side intermediate land 36D in the axial other side has a pressure receiving area that is equal to that of the end surface of the other side land 36E in the axial one side. Accordingly, a hydraulic force in the direction of arrow A is generated in the small-diameter side intermediate land 36C. Therefore, a difference in pressure receiving area between the large-diameter side intermediate land 36C and the small-diameter side intermediate land 36D is generated when the large-diameter side intermediate land 36C and the small-diameter side intermediate land 36D are subjected to the pressure in the controlled primary pressure flow passage 19 through the oil passage hole 34B. That is, the difference in pressure receiving area between the intermediate lands 36C, 36D is generated to the pilot pressure (controlled primary pressure) in the sleeve 34. As a result, the pilot spool 36 is subjected to a hydraulic force (pushing force) corresponding to the difference in pressure receiving area between the large-diameter side intermediate land 36C and the small-diameter side intermediate land 36D as a load in a direction (direction of arrow B) of opposing the push rod 32C.

In addition, the pilot spool 36 is provided with a bottomed axial hole 36F extending axially toward the boss part 36A from the end surface thereof in the axial other side, A tubular orifice 37 is formed in an opening end side (end part of a later-described damping chamber 41-side) of the axial hole 36F, and the axial hole 36F is regularly communicated with the damping chamber 41 via the orifice 37. Further, the pilot spool 36 is provided with oil passages 36G, 36H formed to extend radially outward of the axial hole 36F. The oil passages 36G, 36H cause the inside of the axial hole 36F to be regularly communicated with the inside of the spring accommodating hole part 35A of the sleeve 34 and the inside of the oil passage hole 34C.

A hydraulic oil in a low pressure state is introduced via the oil passage 36H, the axial hole 36F and the oil passage 36G into the spring accommodating hole part 35A of the sleeve 34 from the second tank port 20. The hydraulic oil is introduced into the actuator case 32A of the solenoid actuator 32 along the periphery of the push rod 32C from the outer peripheral side of the boss part 36A in the pilot spool 36 to maintain the inside of the actuator case 32A in a lubricating state, providing a function of cooling the solenoid and the like.

The second return spring 38 is an urging member that regularly urges the pilot spool 36 toward the axial one side. The second return spring 38 is disposed between the spring accommodating hole part 35A of the sleeve 34 (stepped hole 35) and the boss part 36A in the pilot spool 36 in a contracted state. As shown in FIG. 2 and FIG. 4, the pilot spool 36 is accommodated in the sleeve 34 (spring accommodating hole part 35A) in a state of being pushed to the push rod 32C-side of the solenoid actuator 32 by an urging force of the second return spring 38. It should be noted that the push rod 32C of the solenoid actuator 32 is urged to the pilot spool 36-side by a force smaller than that of the second return spring 38 with the spring which is not shown disposed in the actuator case 32A.

The partition plate 39 closes the axial other-side end surface of the sleeve 34 in the bottom side of the solenoid valve cartridge insertion hole 14, A spring member 40 composed of, for example, a wave-shaped washer and the like is disposed between the bottom of the solenoid valve cartridge insertion hole 14 and the partition plate 39, and the spring member 40 holds the partition plate 39 in a state of being pushed to the other-side end surface of the sleeve 34. The partition plate 39 forms the damping chamber 41 in the axial other side of the pilot spool 36.

The damping chamber 41 is arranged at the opposite side to the solenoid actuator 33 across the pilot spool 36, and is a circular space surrounded by an inner peripheral surface (sliding bore part 35E) of the sleeve 34 and the partition plate 39. The damping chamber 41 is regularly communicated with the axial hole 36F of the pilot spool 36 via the orifice 37. Therefore, when the pilot spool 36 moves to the axial other side (in a direction of arrow A in FIG. 4) in the inside of the sleeve 34, the hydraulic oil in the damping chamber 41 is discharged into the axial hole 36F via the orifice 37. The orifice 37 throttles a flow of the discharged oil at this time, thus suppressing an abrupt movement of the pilot spool 36 to regulate a moving speed of the pilot spool 36 to be slow. That is, the movement (moving speed) of the pilot spool 36 is regulated depending upon a throttle diameter of the orifice 37.

As shown in FIG. 4, the pilot spool 36 has the lands 36D, 36E that are formed to have a diameter of d, for example. On the other hand, the main spool 24 is formed to have a diameter of D (refer to FIG. 3). Here, the diameter of D of the pilot spool 36 is formed to be smaller than the diameter of D of the main spool 24. The controlled secondary pressure (output port pressure) a flow amount of which has increased is supplied to the hydraulic pilot part 4B (4A) of the directional control valve 4 as a pilot pressure from the output port 16 of the spool valve device 21. This point will be described later.

The control pressure line 42 has a base end side that is connected to a delivery side of the pilot pump 7 and a tip end side that is connected to the first and second pump ports 17, 18 of the pressure reducing valve units 11A, 11B, respectively, Thereby, the pilot pressure delivered from the pilot pump 7 is supplied to the first and second pump ports 17, 18 as a control pressure for the pressure reducing valve units 11A, 11B. The tank line 43 regularly connects the first and second tank ports 15, 20 of the pressure reducing valve units 11A, 11B to the tank 2. It should be noted that the pump to be connected to the first and second pump ports 17, 18 is not necessarily required to be the pilot pump 7, and may be pumps that are different from each other.

The solenoid type pressure reducing valve units 11A; 11B according to the present embodiment each have the configuration as described above, and next, an explanation will be made of an operation in a case where the pressure reducing valve units 11A, 11B are applied to a driving hydraulic circuit of the hydraulic cylinder 3 to be mounted on a large-sized hydraulic excavator.

First, for operating the solenoid valve device 31 of each of the pressure reducing valve units 11A, 11B, the connector part 32B of the solenoid actuator 32 is connected to the control lever device 10 as shown in FIG. 1 via a power source (not shown). The power source may be any of a DC power source or an AC power source, and for example, DC12V or DC24V is used as the DC power source, and AC100V (50/60 Hz) or AC200V is used as the AC power source.

Until an operator of the hydraulic excavator operates/tilts the control lever 10A as shown in FIG. 1, the control lever 10A is in a neutral position and a control signal (control electric current) is not outputted to the solenoid actuator 32. In an initial state where the electric current is not supplied in this way, the pilot spool 36 is urged to the push rod 32C-side of the solenoid actuator 32 by the second return spring 38. Therefore, the intermediate land 36C of the pilot spool 36 blocks the second pump port 18 from the controlled primary pressure flow passage 19, and the controlled primary pressure flow passage 19 (that is, the pilot pressure chamber 25) is in a state of being communicated with the second tank port 20.

Next, when an operator operates/tilts the control lever 10A to supply a control electric current to the solenoid actuator 32 via the connector part 32B from the control lever device 10, in the solenoid actuator 32 the solenoid in the actuator case 32A is energized and a movable iron core is subjected to an electromagnetic force in accordance with a value of an electric current flowing in a solenoid coil (any of them is not shown). The electromagnetic force is transmitted as a force of pushing the pilot spool 36 in a direction of arrow A through the push rod 32C from the movable iron core. When the pushing force (electromagnetic force) goes beyond the urging force by the second return spring 38, the pilot spool 36 moves (slidingly displaces) to the damping chamber 41-side.

Therefore, the pilot spool 36 operates such that the large-diameter intermediate land 36C goes into a position of the oil passage hole 34B from the sliding bore part 35C to establish the communication between the oil passage holes 34A, 34B (between the second pump port 18 and the controlled primary pressure flow passage 19). At this time, the small-diameter side intermediate land 36D makes a sliding displacement (goes) into the sliding bore part 35D of the sleeve 34 and blocks the communication between the oil passage holes 34B, 34C (between the controlled primary pressure flow passage 19 and the second tank port 20).

Therefore, the hydraulic oil (control pressure) supplied to the second pump port 18 from the control pressure line 42 flows into a space between the sleeve 34 and the pilot spool 36 via the oil passage hole 34A, and is then introduced into the pilot pressure chamber 25 via the controlled primary pressure flow passage 19 from the oil passage hole 34B. As a result, the controlled primary pressure (hydraulic oil) is supplied into the pilot pressure chamber 25 of the spool valve device 21 via the controlled primary pressure flow passage 19 from the solenoid valve device 31, therefore, the controlled primary pressure (pilot pressure) in the pilot pressure chamber 25 is increased.

Here, since the intermediate land 36C of the pilot spool 36 is formed to be larger in diameter than the intermediate land 36D of the pilot spool 36, a difference in pressure receiving area is generated to the pilot pressure (controlled primary pressure) between the intermediate lands 36C, 36D in the sleeve 34. As a result, as described before, the pilot spool 36 is subjected to a hydraulic force (pushing force) corresponding to the difference in pressure receiving area between the large-diameter side intermediate land 36C and the small-diameter side intermediate land 36D as a load in a direction (direction of arrow B) opposing the push rod 32C.

At this time, during a state when a sum of the load (hydraulic force) in the direction of arrow B due to the difference in pressure receiving area and the urging force of the second return spring 38 becomes smaller than the pushing force in the direction of arrow A by the push rod 32C, the pilot spool 36 further moves in the direction of arrow A to the damping chamber 41-side. Therefore, an opening amount between the second pump port 18 and the controlled primary pressure flow passage 19 increases to supply the hydraulic oil further to the controlled primary pressure flow passage 19 from the second pump port 18 and increase the pilot pressure (controlled primary pressure).

On the other hand, when a sum of the load in the direction of arrow B due to the difference in pressure receiving area and the urging force of the second return spring 38 becomes greater than the pushing force in the direction of arrow A by the push rod 32C, the pilot spool 36 is pushed back to the solenoid actuator 32-side in the direction of arrow B. Accordingly, the pilot spool 36 operates such that the large-diameter side intermediate land 36C slides into the sliding bore part 35C to block the communication between the second pump port 18 and the controlled primary pressure flow passage 19. The small-diameter side intermediate land 36D returns back to a position of the oil passage hole 34B flora the inside of the sliding bore part 35D of the sleeve 34 and communicates the controlled primary pressure flow passage 19 with the second tank port 20. Therefore, the hydraulic oil in the pilot pressure chamber 25 is discharged to the second tank port 20 via the controlled primary pressure flow passage 19 to reduce the controlled primary pressure (pilot pressure).

In this way, the pilot spool 36 repeats the movement of reciprocating in the sleeve 34 in an axial direction (directions of arrows A and B), and the inflow and discharge of the hydraulic oil is repeated in the pilot pressure chamber 25. As a result, the pilot pressure (controlled primary pressure) in the pilot pressure chamber 25 is regulated in such a manner as to maintain balance between the pushing force (electromagnetic force) of the push rod 32C added to the pilot spool 36, the urging force of the second return spring 38 and the load (hydraulic force) in the direction of arrow B due to the difference in pressure receiving area. In other words, since the pushing force in the direction of arrow A by the push rod 32C is regulated by a value of the supply electric current to the solenoid actuator 32, the pilot pressure (controlled primary pressure) in the pilot pressure chamber 25 results in being variably controlled by the value of the supply electric current to the solenoid actuator 32.

It should be noted that, in this way, a volumetric variation is generated in the damping chamber 41 due to the movement (axial displacement) of the pilot spool 36 in the process of regulating the pressure (controlled primary pressure) in the pilot pressure chamber 25. At this time, since the hydraulic oil flows in the orifice 37 following the volumetric variation of the damping chamber 41, the orifice 37 achieves a damping function of generating a flow resistance to suppress an abrupt volumetric variation. In this way, providing the orifice 37 and the damping chamber 41 enables an abrupt axial displacement of the pilot spool 36 to be suppressed and the vibration to be absorbed, therefore stabilizing the pilot pressure (controlled primary pressure).

On the other hand, in a state where an operator returns the control lever 10A (refer to FIG. 1) to the neutral position to stop the supply of the control electric current to the solenoid actuator 32, in the solenoid actuator 32 the solenoid is demagnetized and the push rod 32C is returned back to the initial state (waiting position) in the direction of arrow B. Therefore, the pilot spool 36 is pushed back to the solenoid actuator 32-side by the urging force of the second return spring 38. As a result, the communication of the second pump port 18 with the controlled primary pressure flow passage 19 is blocked, and the controlled primary pressure flow passage 19 is communicated with the second tank port 20. Therefore, the hydraulic oil in the pilot pressure chamber 25 is discharged to the second tank port 20 via the controlled primary pressure flow passage 19, and the controlled primary pressure (pilot pressure) is lowered to the tank pressure following stop of the control electric current.

Next, an explanation will be made of an operation of the spool valve device 21 configuring the pressure reducing valve unit 11B (11A) together with the solenoid valve device 31. The spool valve device 21 configures a flow amount increasing device (that is, a booster) that increases a flow amount of the controlled primary pressure (pilot pressure) generated by the solenoid, valve device 31 in response to the control signal (that is, the control electric current) from the control lever device 10.

In the initial state (waiting position) where the control electric current is not supplied to the solenoid actuator 32, the pilot pressure chamber 25 is communicated with the second tank port 20 via the controlled primary pressure flow passage 19, and a pressure of the pilot pressure chamber 25 is in a lowest state. Therefore, the main spool 24 is urged to the axial one side by the first return spring 27 to be in a state of abutting on the closing plug 22. At this time, the output port 16 is blocked to the first pump port 17 and is communicated with the first tank port 15.

Figure 6:
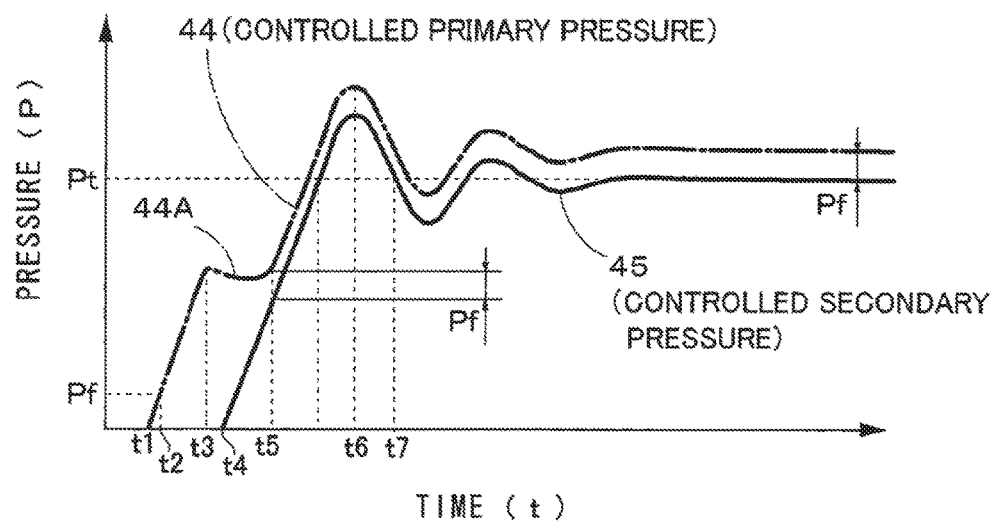
FIG. 6 is a characteristic line diagram showing a relationship between a pressure (controlled primary pressure) in a pilot pressure chamber and a pressure (controlled secondary pressure) of an output port according to the first embodiment.

Here, as described before, when the control electric current is supplied to the solenoid actuator 32 of the solenoid valve device 31, as a characteristic line 44 shown in a dashed-dotted line in FIG. 6, the controlled primary pressure (pilot pressure) in the pilot pressure chamber 25 starts to increase at time t1. The main spool 24 receives the controlled primary pressure (pilot pressure) on the first pressure receiving part 28 provided in the pilot pressure chamber 25-side.

When the controlled primary pressure increases until a pressure Pf (that is, a pressure in accordance with an urging force f of the first return spring 27) or more at time t2 in FIG. 6, a hydraulic force F1 (load) toward the axial other side that the main spool 24 receives in the diameter of u goes beyond the urging force f of the first return spring 27. Therefore, the main spool 24 moves further to the feedback pressure chamber 26-side by the hydraulic force F1 (refer to FIG. 5).

When the main spool 24 moves to the feedback pressure chamber 26-side, the end edge 30A of the throttle passage 30 goes (moves) to the axial one-side end surface of the annular groove 13B, and at time t3 in FIG. 6, the pilot pressure chamber 25 and the first tank port 15 are communicated via the throttle passage 30. Therefore, a part of the hydraulic oil (controlled primary pressure) in the pilot pressure chamber 25 is discharged to the first tank port 15 via the throttle passage 30, and a pressure increase in the pilot pressure chamber 25 becomes gradual as a characteristic line part 44A shown in a dashed-dotted line.

When the main spool 24 moves further to the feedback pressure chamber 26-side, the output port 16 is communicated, with the first pump port 17, and the communication between the first tank port 15 and the output port 16 is blocked. Therefore, the hydraulic oil is supplied to the output port 16 via the first pump port 17 from the control pressure line 42, and as a characteristic line 45 shown in a solid line in FIG. 6, the hydraulic oil (controlled secondary pressure) in the output port 16 increases at time t4 or later.

At this time, since the output port 16 is communicated with the feedback pressure chamber 26 via the through hole 24C, the communicating hole 24E and the through hole 24D in the main spool 24, the controlled secondary pressure is introduced to the feedback pressure chamber 26. Therefore, the pressure (controlled secondary pressure) of the output port 16 is received in the diameter of D on the second pressure receiving part 29-side of the main spool 24 in the feedback pressure chamber 26 to generate a hydraulic force F2 (load) of pushing the main spool 24 back to the pilot pressure chamber 25-side.

However, during time t4 to time t5 in FIG. 6, since the hydraulic force F1 is greater than a sum of the hydraulic force F2 and the urging force f (F2+f), the main spool 24 moves further to the feedback pressure chamber 26 (axial other side) by the load (hydraulic force F1) by the controlled primary pressure. As a result, an opening amount (flow passage area) via the throttle passage 30 between the pilot pressure chamber 25 and the first tank port 15 increases, and the hydraulic oil (a part of controlled primary pressure) is discharged to the first tank port 15 via the throttle passage 30 from the pilot pressure chamber 25.

Therefore, during time t4 to time t5 in FIG. 6, a pressure increase in the pilot pressure chamber 25 becomes more gradual as the characteristic line part 44A shown in the dashed-dotted line or the pressure in the pilot pressure chamber 25 is reversed to decrease. Moreover, at time t5 or later, a value found by subtracting the pressure Pf from the controlled primary pressure of the characteristic line part 44A becomes approximately equal to the controlled secondary pressure of the characteristic line 45, and the controlled primary pressure continues to increase until time t6 as similar to the controlled secondary pressure.

During time t5 to time t6 in FIG. 6, an opening amount (flow passage area) between the output port 16 and the first pump port 17 increases, and the hydraulic oil is supplied further to the output port 16 from the first pump port 17. Thereby, the pressure (controlled secondary pressure) of the output port 16 increases as the characteristic line 45. As a result, the controlled primary pressure, together with the controlled secondary pressure, increases until a pressure exceeding a target pressure Pt (that is, a target value of a controlled primary pressure set by the solenoid valve device 31 in response to a control signal from the control lever device 10).

When a sum of the hydraulic force F2 and the urging force f (F2+f) is greater than the hydraulic force F1, the moving direction of the main spool 24 is reversed, and the main spool 24 is pushed back in the axial one side to the pilot pressure chamber 25-side by the hydraulic force F2 in the feedback pressure chamber 26-side and the urging force f of the first return spring 27. Therefore, the opening amount (that is, the flow passage area of the throttle passage 30) via the throttle passage 30 between the pilot pressure chamber 25 and the first tank port 15 reduces.

Therefore, since the throttle passage 30 suppress a hydraulic oil amount to be discharged to the first tank port 15 from the pilot pressure chamber 25 to be small, the pressure (controlled primary pressure) in the pilot pressure chamber 25 again starts to increase. In addition, when the communication between the output port 16 and the first pump port 17 is blocked and the communication between the first tank port 15 and the output port 16 is established, as shown at time t6 or later in FIG. 6, the hydraulic oil is discharged to the first tank port 15 from the output port 16 to reduce the pressure of the output port 16.

According to the movement as described above, the inflow and discharge of the hydraulic oil is repeated in the output port 16, and the pressure (controlled secondary pressure) of the output port 16 is regulated to create balance between a sum of the hydraulic force F2 and the urging force f (F2+f) and the hydraulic force F1. The pressure (controlled secondary pressure) of the output port 16 is regulated to converge into the target pressure Pt as the characteristic line 45 shown in FIG. 6. That is, the pressure (controlled secondary pressure) of the output port 16 is a value found by subtracting a pressure Pf equivalent to the urging force f by the first return spring 27 from the controlled primary pressure in the pilot pressure chamber 25.

Figure 5:
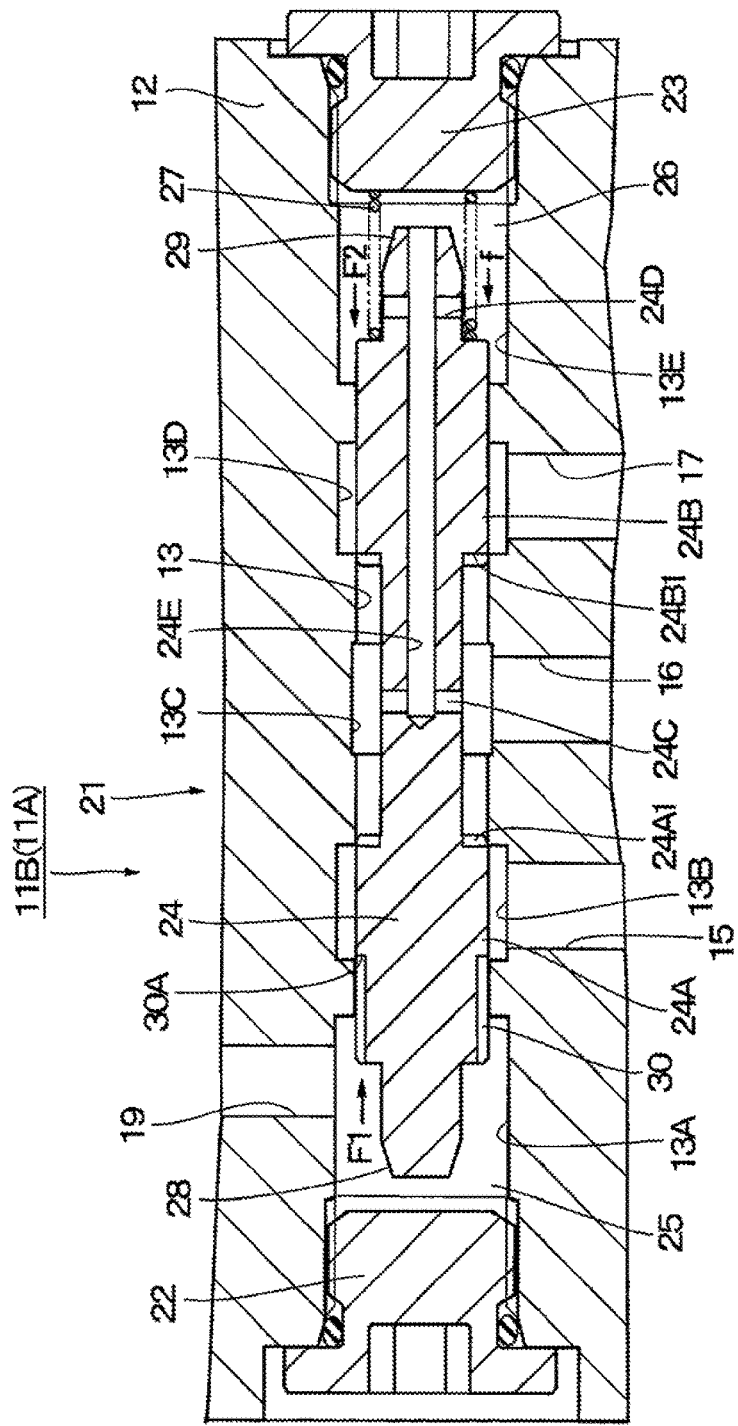
FIG. 5 is a longitudinal sectional view showing the spool valve device in FIG. 3 in an operating state.

At this time, the main spool 24 moves to a position where the dimension L13 shown in FIG. 3 becomes substantially zero, which is, as shown in FIG. 5, a position where the axial other-side end surface (that is, a bottom surface of the notch 24A1) of the one side land 24A becomes substantially flush with the axial other-side end surface of the annular groove 13B. In addition, the axial one-side end surface (that is, a bottom surface of the notch 24B1) of the other side land 24B moves to a position where the dimension L12 shown in FIG. 3 becomes substantially zero, which is, as shown in FIG. 5, a position of being substantially flush with the axial one-side end surface of the annular groove 13D, and the main spool 24 stops.

The pressure (controlled primary pressure) in the pilot pressure chamber 25 can be regulated by a value of the supply electric current to the solenoid actuator 32. Therefore in the solenoid type pressure reducing valve units 11A, 11B according to the present embodiment, the pressure (controlled secondary pressure) in the output port 16 also results in being regulated by the value of the supply electric current to the solenoid actuator 32. Accordingly, the spool valve device 21 can supply as the pilot pressure the controlled secondary pressure (pressure of the output port) a flow amount of the controlled primary pressure has increased by the solenoid valve device 31 respectively to the hydraulic pilot parts 4A, 4B of the directional control valve 4.

That is, the directional control valve 4 to be mounted on the large-sized hydraulic excavator is configured by a large-sized control valve corresponding to the hydraulic cylinder 3 having a large cylinder diameter. Therefore, the directional control valve 4 is required to increase a flow amount of the pilot pressure (that is, the controlled secondary pressure) to be supplied to the hydraulic pilot parts 4A, 4B from the pressure reducing valve units 11A, 11B, and the spool valve device 21 may be used as a flow amount increasing device therefor.

In a case of stopping the electric current supply to the solenoid actuator 32, the hydraulic oil in the pilot pressure chamber 25 is discharged to the second tank port 20 through the controlled primary pressure flow passage 19. Therefore, the main spool 24 is pushed back to the pilot pressure chamber 25-side by the hydraulic force F2 (load) by a pressure of the output port 16 receiving with the diameter of D in the feedback pressure chamber 26 and the urging force f of the first return spring 27. Therefore, the output port 16 is blocked from the first pump port 17 and is communicated with the first tank port 15. As a result, the hydraulic oil is discharged to the first tank port 15 from the output port 16 to reduce the pressure (controlled secondary pressure) in the output port 16. In addition, the pilot pressure chamber 25 is blocked to the first tank port 15 by closing the throttle passage 30.

Figure 7:
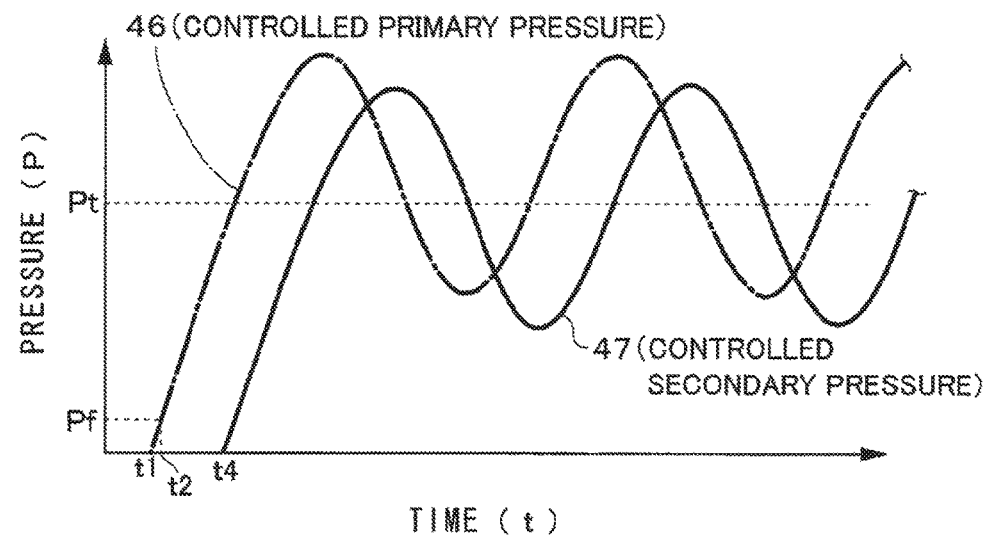
FIG. 7 is a characteristic line diagram showing a relationship between a pressure (controlled primary pressure) in a pilot pressure chamber and a pressure (controlled secondary pressure) of an output port according to a comparative example.

Incidentally, a characteristic line 46 shown in a dashed-dotted line in FIG. 7 is characteristics of a pressure (controlled primary pressure) in the pilot pressure chamber 25 by a comparative example. The characteristic line 46 by the comparative example shown characteristics in a case where the throttle passage 30 is not provided in the axial one side of the main spool 24. Therefore, the controlled primary pressure of the characteristic line 46 continues to increase after time t2 as well, and repeatedly varies to go beyond or below the target pressure Pt.

A characteristic line 47 shown in a solid line in FIG. 7 is characteristics of a pressure (controlled secondary pressure) in the output port 16 by a comparative example. In this comparative example, the throttle passage 30 is not provided in the main spool 24, thus the controlled secondary pressure shown by the characteristic line 47 increases after time t4, and thereafter, produces a response delay to the controlled primary pressure (characteristic line 46), and repeatedly varies to go beyond or below the target pressure Pt in such a manner as to oppose the characteristic line 46.

Therefore, in a case of the comparative example, at the time of changing the pilot pressure to control pressures in proportion to the supply electric current, the pressure (characteristic line 47) of the output port 16 cannot follow the change in the pilot pressure to maintain balance to the controlled primary pressure (characteristic line 46), and the main spool 24 generates self-excited vibrations to repeat axial vibrations. Further, the self-excited vibration of the main spool 24 gives an influence on the pilot spool 36 in the solenoid valve device 31 (pressure control valve 33) as well, which causes the pilot spool 36 as well to repeatedly vibrate in the sleeve 54. As a result, the characteristic line 46 (controlled primary pressure) and the characteristic line 47 (controlled secondary pressure) shown in FIG. 7 repeatedly vary to go beyond or below the target pressure Pt, which makes it difficult to take out a stable pressure (controlled secondary pressure) from the output port 16.

Therefore, for solving the problems, in the first embodiment, the axial one side of the main spool 24 is provided with the throttle passage 30 that regularly blocks the pilot pressure chamber 25 from the first tank port 15 and communicates the pilot pressure chamber 25 with the first tank port 15 at the time the main spool 24 moves to the axial other side along the main spool insertion hole 13. The throttle passage 30 is a throttle passage that limits a flow amount of the hydraulic oil to be discharged to the first tank port 15 from the pilot pressure chamber 25 at the time of communicating the pilot pressure chamber 25 with the first tank port 15.

In addition, the throttle passage 30 is, as shown in FIG. 3 and in the formula 1, designed such that the dimension L11 is set to be smaller than each of the dimensions L2, L13. Therefore, the throttle passage 30 has a function of communicating the pilot pressure chamber 25 with the first tank port 15 prior to two points that the communication between the first pump port 17 (primary pressure port) and the output port 16 is established and the communication between the output port 16 and the first tank port 15 is blocked when the main spool 24 moves to the axial other side along the main spool insertion hole 13.

Thereby, at the time of moving the main spool 24 to the feedback pressure chamber 26-side by increasing the controlled primary pressure from the initial state (time t1 in FIG. 6), the throttle passage 30 opens at time t3, making it possible to discharge a part of the hydraulic oil from the pilot pressure chamber 25 to the first tank port 15. The time t3 is a time before the communication between the first pump port 17 and the output port 16 is established to start to increase the pressure (controlled secondary pressure) in the output port 16. In this way, the throttle passage 30 is caused to open at time t3 to discharge a part of the hydraulic oil from the pilot pressure chamber 25 to the first tank port 15, which, as shown in the characteristic line part 44A in FIG. 6, produces characteristics that an increase of the controlled primary pressure (pilot pressure) is gradual.

Here, in a case where the communication between the first pump port 17 and the output port 16 is established to immediately increase the pressure (controlled secondary pressure) in the output port 16, the load (hydraulic force F1) by the pilot pressure acting on the main spool 24, the load (hydraulic force F2) by the pressure (controlled secondary pressure) in the output port 16 and the urging force f by the first return spring 27 immediately changes into a balancing state, and the main spool 24 becomes stable in a balancing position of these forces.

In addition, although the communication between the first pump port 17 and the output port 16 is established, even in a case where an increase of the pressure (controlled secondary pressure) in the output port 16 is delayed to an increase of the pressure (controlled primary pressure) in the pilot pressure chamber 25, the controlled primary pressure has characteristics of gradually increasing as the characteristic line part 44A in FIG. 6, thus reducing a difference between the load (hydraulic force F1) by the pilot pressure and the load (hydraulic force F2) by the pressure (controlled secondary pressure) in the output port 16. Therefore, the pressure (controlled secondary pressure) in the output port 16 can follow the pilot pressure to maintain the balance.

In addition, in a case where the increase of the pressure (controlled secondary pressure) in the output port 16 is remarkably delayed to the increase of the controlled primary pressure (pilot pressure), the main spool 24 moves further to the feedback pressure-chamber 26-side. At this time, the opening amount (flow passage area) between the pilot pressure chamber 25 and the first tank port 15 further increases, as well as the opening amount between the output port 16 and the first pump port 17 further increases. That is, the hydraulic oil in the pilot pressure chamber 25 is discharged further to the first tank port 15, and the pilot pressure is reversed to reduce. On the other hand, the hydraulic oil is delivered further to the output port 16 via the control pressure line 42 and the first pump port 17 from the pilot pump 7 to cause the pressure (controlled secondary pressure) in the output port 16 to continue to increase further.

Therefore, as the characteristic line 45 at time t7 or later as shown in FIG. 6, the main spool 24 generates a function of causing the pressure (controlled secondary pressure) in the output port 16 to follow the pressure in the pilot pressure chamber 25 for balance therebetween, Therefore, the load (hydraulic force F1) by the controlled primary pressure (pilot pressure) acting on the main spool 24, the load (hydraulic force F2) by the pressure (controlled secondary pressure) in the output port 16 and the urging force f by the first return spring 27 goes into a balancing state, making it possible to stabilize the movement of the main spool 24.

Accordingly, the solenoid type pressure reducing valve units 11A, 11B according to the first embodiment can cause the pressure (controlled secondary pressure) in the output port 16 to follow the pressure (controlled primary pressure) in the pilot pressure chamber 25 for balance therebetween, thus suppressing the self-excited vibration of the main spool 24. Therefore, in a case of connecting a component low in wall surface rigidity such as the pilot lines 5A, 5B, and the like to the output port 16, even in a case of connecting a component having a load volume as large as to delay response of a pressure (for example, the hydraulic pilot parts 4A, 4B in the large-sized directional control valve 4), the solenoid type pressure reducing valve units 11A, 11B according to the present embodiment can output a stable pressure (controlled secondary pressure) from the output port 16.

Figure 8:
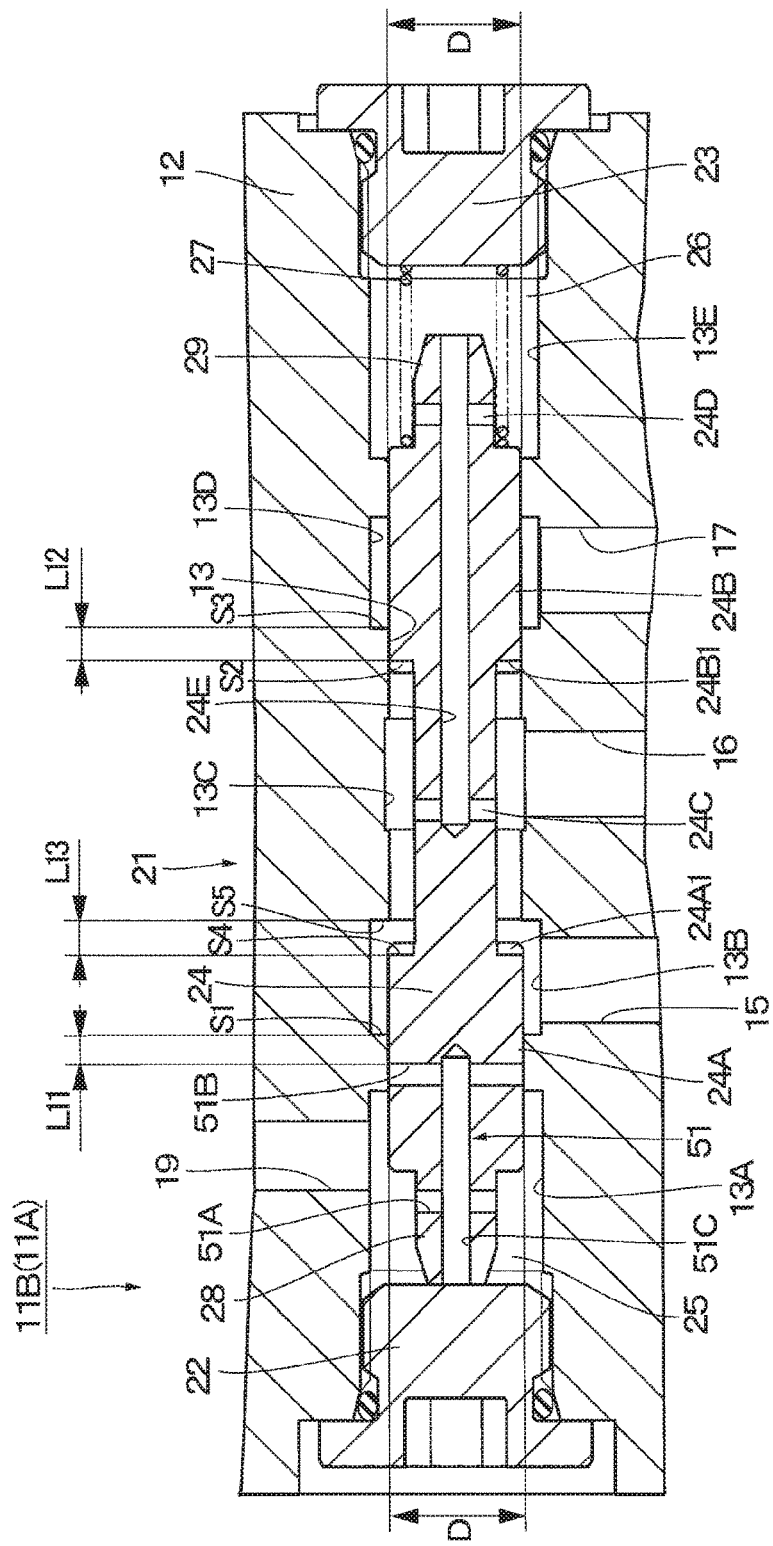
FIG. 8 is a longitudinal sectional view showing a spool valve device in a pressure reducing valve unit at a non-operating time according to a second embodiment.

Next, FIG. 8 shows a second embodiment according to the present invention, and in the present embodiment, components identical to those in the first embodiment are referred to as identical reference numerals, and an explanation thereof is omitted. However, the second embodiment is characterized in that a throttle passage 51 is configured of not the oil hole formed on the outer peripheral side of the main spool 24, but oil holes axially and radially extending in the inside of the main spool 24.

Here, the throttle passage 51 is configured of a radial through hole 51A that is formed in a one-side end part of the main spool 24 positioned closer to the axial one side than the one side land 24A and is regularly communicated with the pilot pressure chamber 25, one or more of through holes 51B that are formed radially in the main spool 24 to open on the outer peripheral surface of the one side land 24A, and a communicating hole 51C that extends in the axial direction of the main spool 24 for communication between the through holes 51A, 51B. The communicating hole 51C opens on the one-side end surface of the main spool 24 in the axial direction to be regularly communicated with the pilot pressure chamber 25.

As shown in FIG. 8, when the main spool 24 is in a waiting position (initial state), the other-end side surface of an opening of the through hole 51B in the throttle passage 51 is arranged in a position to be spaced by a dimension L11 from the axial one-side end surface of the annular groove 13B. Therefore, the throttle passage 51 is configured in such a manner as to, when the main spool 24 moves to the axial other side by the dimension L11 from the waiting position, start for the through hole 51B to be communicated with the inside of the annular groove 13B and limit a flow amount of the hydraulic oil to be discharged to the first tank port 15 via the through hole 51A, the communicating hole 51C and the through hole 51B from the pilot pressure chamber 25.

When the main spool 24 is in the waiting position, the axial one-side end surface of the other side land 24B (that is, the bottom surface of the notch 24B1) is arranged in a position to be spaced by a dimension L12 from the axial one-side end surface of the annular groove 13D. The axial other-side end surface of the one side land 24A (that is, the bottom surface of the notch 24A1) is arranged in a position to be spaced by a dimension L13 from the axial other-side end surface of the annular groove 13B.

Here, the dimensions L11, L12, L13 are set to a relationship in which the dimension L11 is smaller than the dimension L12 (L11<L12) and the dimension L11 is smaller than the dimension L13 (L11<L13). That is, the dimensions L11, L12, L13 are set to the relationship as similar to the above-mentioned formula 1. Therefore, when the main spool 24 moves from the waiting position where the end part of the main spool 24 in the axial one side (that is, the tip end part of the first pressure receiving part 28) abuts on the closing plug 22 to the axial other side (feedback pressure chamber 26-side), the pilot pressure chamber 25 and the first tank port 15 are first communicated through the throttle passage 51. After that, the output port 16 is communicated with the first pump port 17, and the first tank port 15 is blocked from the output port 16.

In other words, when the main spool 24 moves from the waiting position to the axial other side along the main spool insertion hole 13, the through hole 51B of the throttle passage 51 has a function of communicating the pilot pressure chamber 25 with the first tank port 15 before two states composed of a state of communicating the first pump port 17 (primary pressure port) with the output port 16 and a state of blocking the first tank port 15 from the output port 16.

In this way, also the second embodiment as thus configured can cause the pressure (controlled secondary pressure) in the output port 16 to follow the pressure (controlled primary pressure) in the pilot pressure chamber 25 for balance therebetween, thus suppressing the self-excited vibration of the main spool 24. As a result, the second embodiment can acquire an operational effect as substantially similar to that of the first embodiment.

Figure 9:
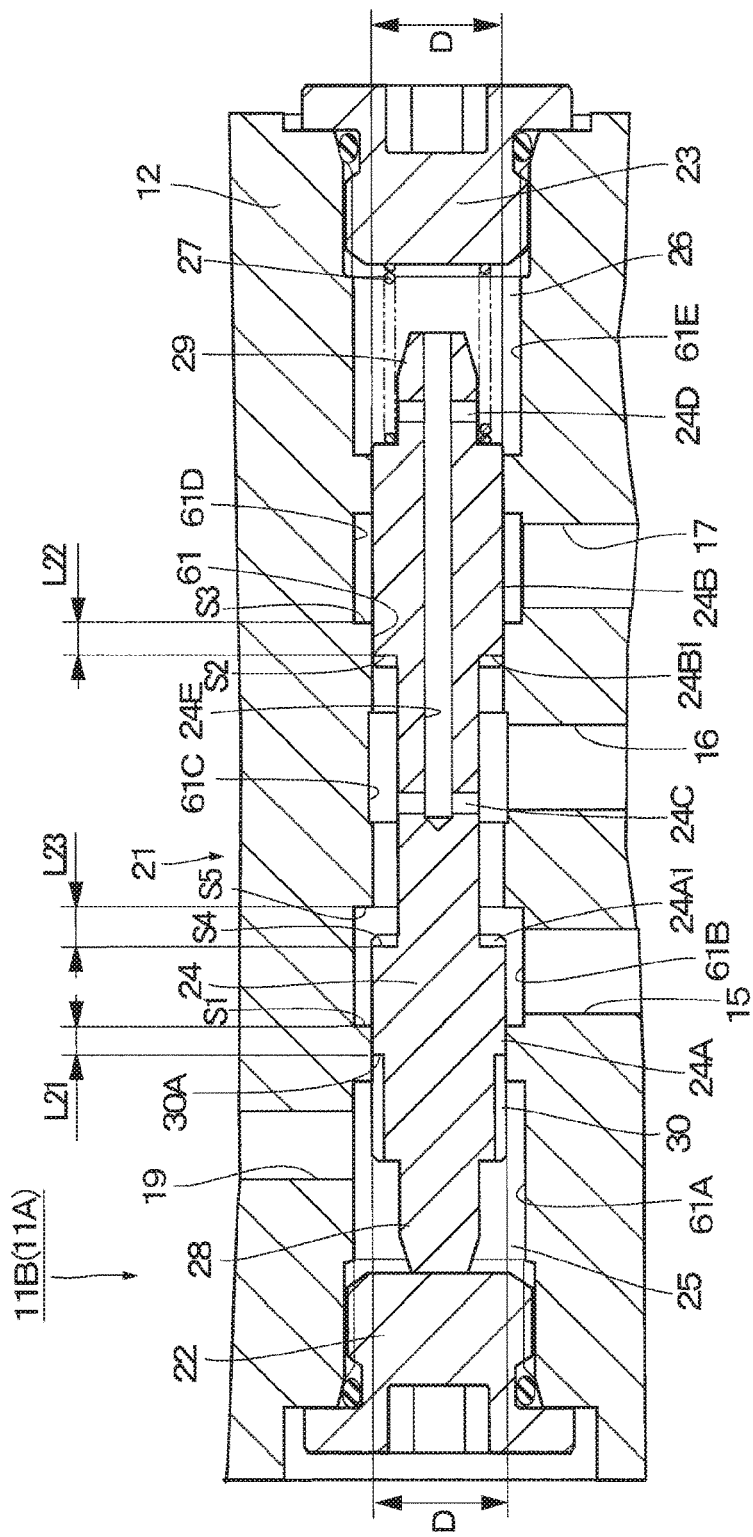
FIG. 9 is a longitudinal sectional view showing a spool valve device in a pressure reducing valve unit at a non-operating time according to a third embodiment.
Figure 10:
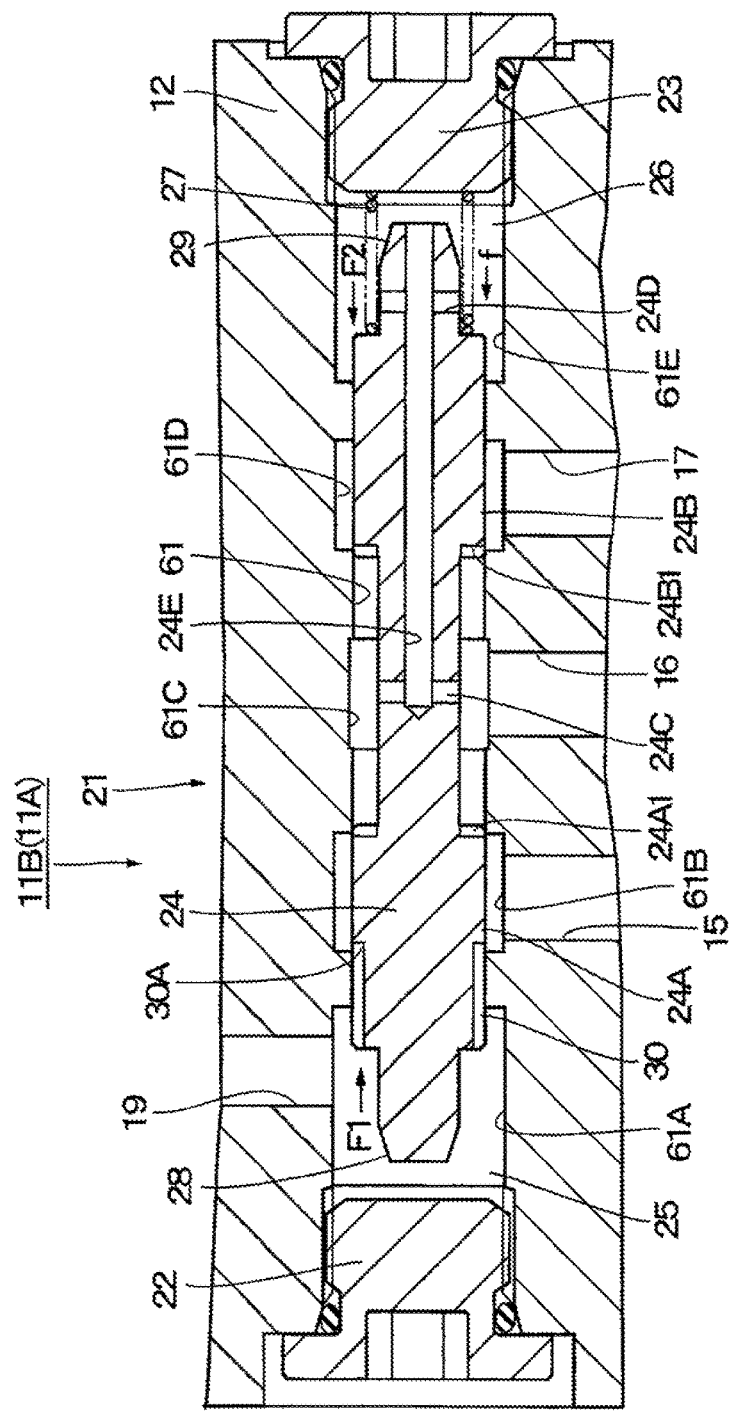
FIG. 10 is a longitudinal sectional view showing the spool valve device in FIG. 9 in an operating state.
Figure 11:
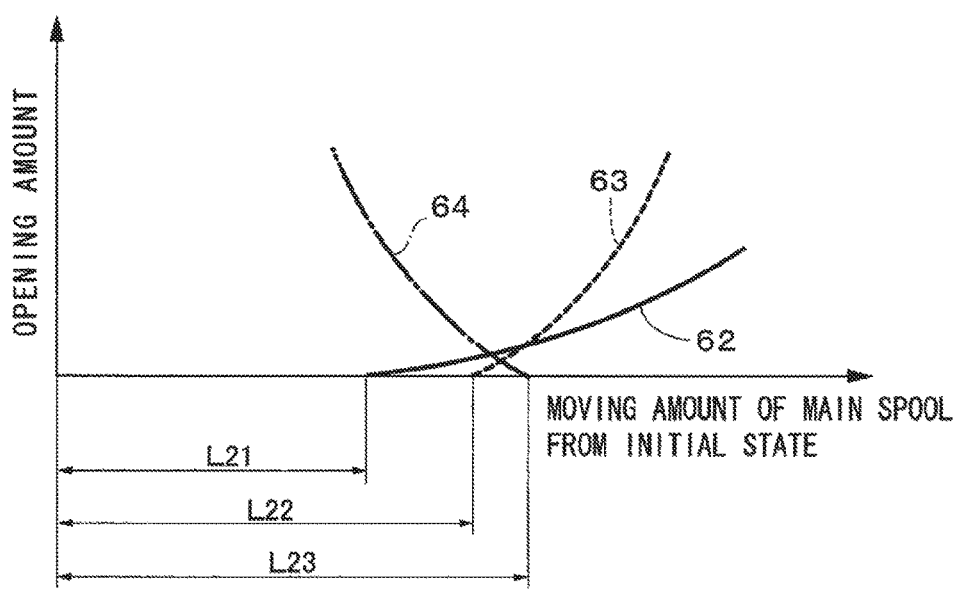
FIG. 11 is a characteristic line diagram showing an opening characteristic of the spool valve device according to the third embodiment.

Next, FIG. 9 to FIG. 11 show a third embodiment according to the present invention. The present embodiment is characterized in that, by moving the spool to the axial other side along the spool hole, the communication between the output port and the tank port is blocked after the communication between the primary pressure port and the output port is established. It should be noted that, in the third embodiment, components identical to those in the first embodiment are referred to as identical reference numerals, and an explanation thereof is omitted.

Here, a main spool insertion hole 61 forming part of a spool hole is provided in the housing 12 of the pressure reducing valve unit 11B as similar to the main spool insertion hole 13 described in the first embodiment. The main spool insertion hole 61 is provided with annular grooves 61A, 61B, 61C, 61D, 61E formed as enlarged-diameter holes in a peripheral wall surface side. The annular grooves 61A to 61E are arranged to be spaced from each other in an axial direction of the main spool insertion hole 61. The main spool insertion hole 61 is configured such that open end sides of the annular grooves 61A, 61E positioned in both of axial end sides out of the annular grooves 61A to 61E are removably closed by the closing plugs 22, 23, respectively.

As shown in FIG. 9, when the main spool 24 is in the waiting position, the end edge 30A of the throttle passage 30 is arranged in a position of being spaced by a dimension L21 as a first distance from an axial one-side end surface of the annular groove 61B. At this time, an axial one-side end surface (that is, the bottom surface of the notch 24B1) of the other side land 24B is arranged in a position of being spaced by a dimension L22 as a second distance from an axial one-side end surface of the annular groove 61D. An axial other-side end surface (that is, the bottom surface of the notch 24A1) of the one side land 24A is arranged in a position of being spaced by a dimension L23 as a third distance from an axial other-side end surface of the annular groove 61B.

Here, the dimensions L21, L22, L23 are set to a relationship in which the dimension L21 is smaller than the dimension L22 (L21<L22) and the dimension L21 is smaller than the dimension L23 (L21<L23). Further, the annular groove 61B of the main spool insertion hole 61 is set to a relationship that the dimension L23 as a distance from the axial other-side end surface to the axial other-side end surface (that is, the bottom surface of the notch 24A1) of the one side land 24A is larger than the dimension L22 as a distance from the axial one-side end surface (that is, the bottom surface of the notch 24B1) of the other side land 24E to the axial one-side end surface of the annular groove 61D. That is, the dimensions L21, L22, L23 are set to a relationship of the following formula 2.

$$L21<L22<L23 \quad \text{[Formula 2]}$$

Therefore, when the main spool 24 axially moves from the initial state (waiting position) shown in FIG. 9 to the feedback pressure chamber 26-side, as a characteristic line 62 shown in a solid line in FIG. 11 the throttle passage 30 opens in an opening amount in accordance with a moving amount (movement of the dimension L21 or more) of the main spool 24, and the pilot pressure chamber 25 is communicated with the first tank port 15 through the throttle passage 30. Next, when the moving amount of the main spool 24 is equal to or more than the dimension L22, the other side land 24B is communicated with the inside of the annular groove 61D through the notch 24B1, and the output port 16 is communicated with the first pump port 17 (that is, the primary pressure port) in an opening amount according to a characteristic line 63 shown in a dotted line.

During the above period, in the one side land 24A of the main spool 24 the notch 24A1 in the axial other side gradually approaches the other-side end surface of the annular groove 61B to reduce an opening amount between both of them according to the characteristic line 64 shown in a dashed-dotted line, but the first tank port 15 is communicated with the output port 16. However, when the moving amount of the main spool 24 is equal to more than the dimension L23, the notch 24A1 of the one side land 24A goes into the annular groove 618 to reduce the opening amount to be zero and the first tank port 15 is blocked from the output port 16.

That is, when the main spool 24 moves from the waiting position (initial state) where the tip end part of the first pressure receiving part 28 abuts on the closing plug 22 to the axial other side (feedback pressure chamber 26-side), the pilot pressure chamber 25 and the first tank port 15 are first communicated through the throttle passage 30. After that, the output port 16 is communicated with the first pump port 17, and finally, the output port 16 is blocked from the first tank port 15.

In this way, the third embodiment as configured above can also suppress the self-excited vibration of the main spool 24 to output the stable controlled secondary pressure from the output port 16. Therefore the third embodiment can acquire an effect as similar to that of the first embodiment. Particularly, according to the third embodiment, as shown in the above formula 2, the dimension L23 from the axial other-side end surface of the annular groove 61B of the main spool insertion hole 61 to the axial other-side end surface (that is, the bottom surface of the notch 24A1) of the one side land 24A is set to be larger than the dimension L22 from the axial one-side end surface (that is, the bottom surface of the notch 24B1) of the other side land 24B to the axial one-side end surface of the annular groove 61D.

Thereby, in the state where the hydraulic force F1 by the controlled primary pressure (pilot pressure) acting on the main spool 24, the hydraulic force F2 by the pressure (controlled secondary pressure) in the output port 16 and the urging force f by the first return spring 27 are balanced to stabilize the movement of the main spool 24. In this state (for example, in a state where the main spool 24 is substantially stopped), as shown in FIG. 10 the first pump port 17 is communicated with the output port 16, and at the same time, the output port 16 is communicated with the first tank port 15.

Therefore, next, when the pilot pressure (controlled primary pressure) is changed from the balanced state shown in FIG. 10 to change the pressure (controlled secondary pressure) of the output port, since the first pump port 17 is communicated/opened with the output port 16 and the output port 16 is communicated/opened with the first tank port 15 already, the inflow or discharge of the controlled secondary pressure (hydraulic oil) in the output port 16 speeds up as much, acquiring an effect of increasing a response speed of the controlled secondary pressure.

It should be noted that the third embodiment is explained by taking a case where the dimensions L21 to L23 shown in FIG. 9 are set to the relationship of the above formula 2 by changing, for example, the shape (position) of each of the annular grooves 61B, 61D out of the annular grooves 61A to 61E of the main spool insertion hole 61, as an example. The present invention is, however, not limited thereto, but may be configured to set the dimensions L21 to L23 to the relationship of the above formula 2 by changing a shape (axial length) of each of the lands 24A, 24B of the main spool 24, for example.

Figure 12:
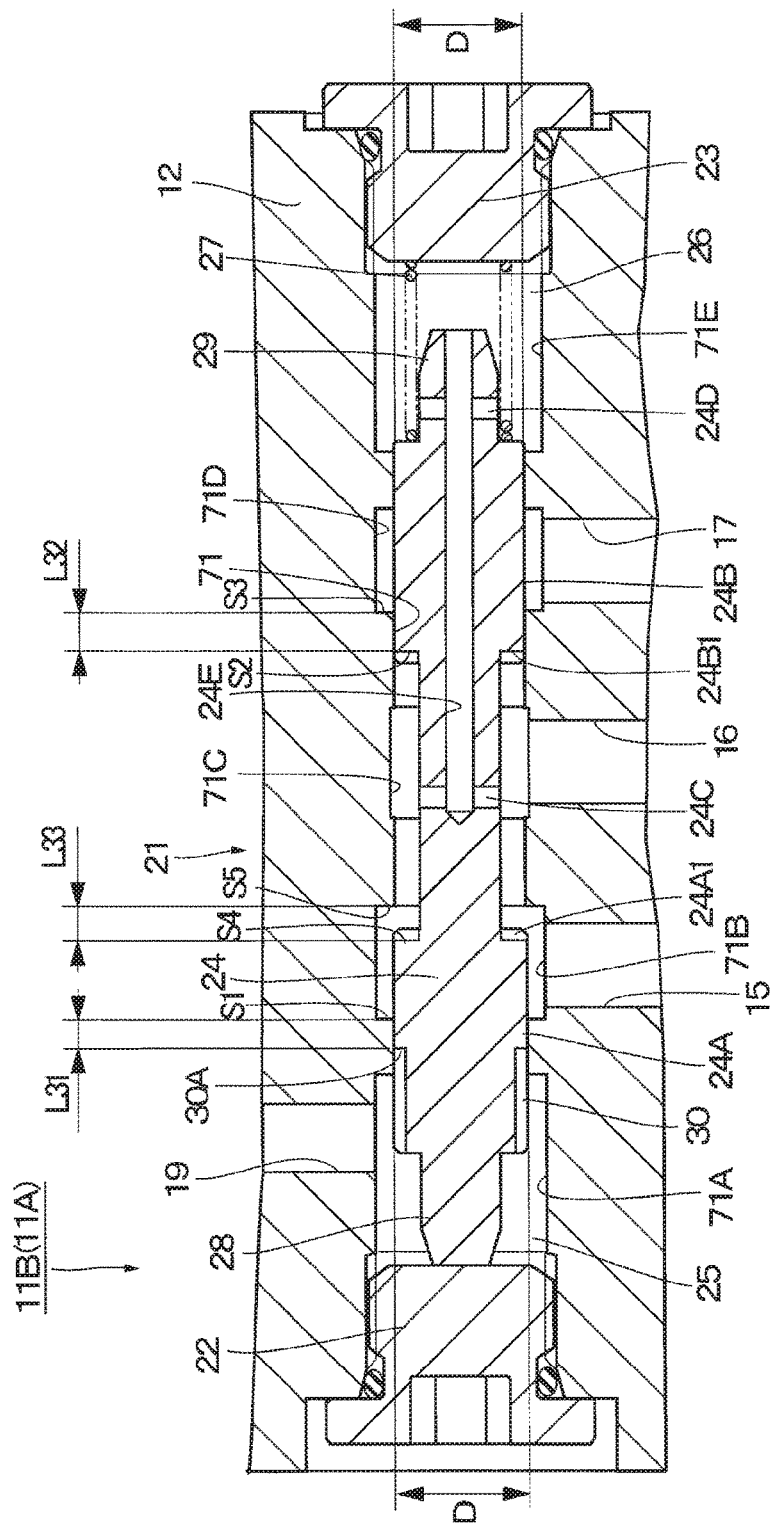
FIG. 12 is a longitudinal sectional view showing a spool valve device in a pressure reducing valve unit at a non-operating time according to a fourth embodiment.
Figure 13:
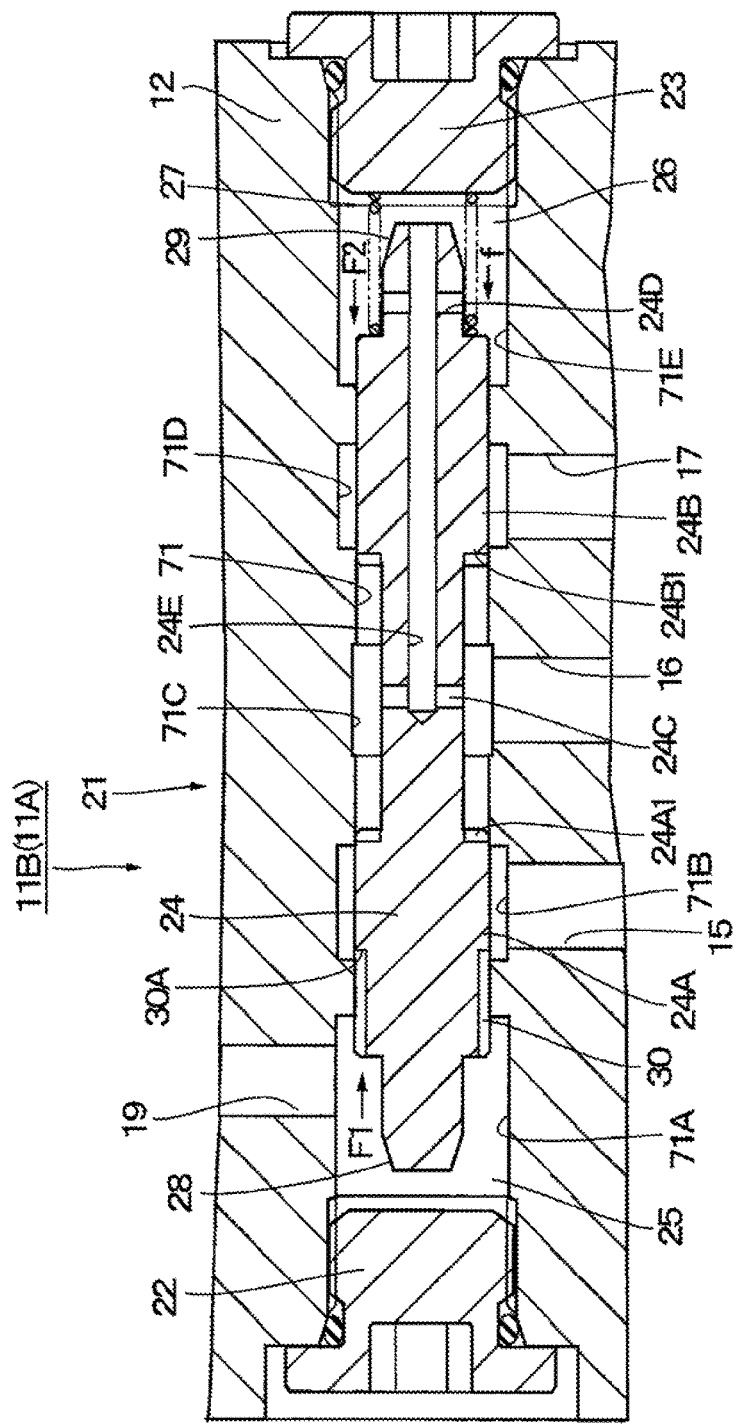
FIG. 13 is a longitudinal sectional view showing the spool valve device in FIG. 12 in an operating state.
Figure 14:
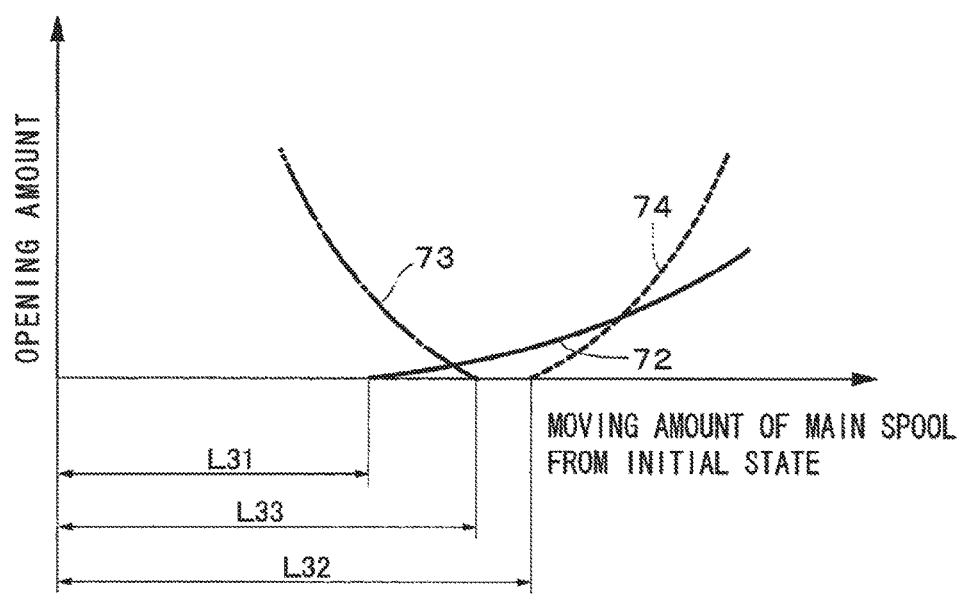
FIG. 14 is a characteristic line diagram showing an opening characteristic of the spool valve device according to the fourth embodiment.

Next, FIG. 12 to FIG. 14 show a fourth embodiment according to the present invention. The fourth embodiment is characterized in that, when the spool moves to the axial other side along the spool hole, the output port is blocked from the tank port before communicating the primary pressure port with the output port. It should be noted that, in the fourth embodiment, components identical to those in the first embodiment are referred to as identical reference numerals, and an explanation thereof is omitted.

Here, a main spool insertion hole 71 forming part of a spool hole is provided in the housing 12 of the pressure reducing valve unit 11B as similar to the main spool insertion hole 13 described in the first embodiment. The main spool insertion hole 71 is provided with annular grooves 71A, 718, 71C, 71D, 71E formed as enlarged-diameter holes on a peripheral wall surface side. The annular grooves 71A to 71E are arranged to be spaced from each other in an axial direction of the main spool insertion hole 71. The main spool insertion hole 71 is configured such that open end sides of the annular grooves 71A, 71E positioned in both of the axial end sides out of the annular grooves 71A to 71E are removably closed by the closing plugs 22, 23, respectively.

As shown in FIG. 12, when the main spool 24 is in the waiting position, the end edge 30A of the throttle passage 30 is arranged in a position of being spaced by a dimension L31 as a first distance from an axial one-side end surface of the annular groove 71B. At this time, an axial one-side end surface (that is, the bottom surface of the notch 24B1) of the other side land 24B is arranged in a position of being spaced by a dimension L32 as a second distance from an axial one-side end surface of the annular groove 71D. Further, an axial other-side end surface (that is, the bottom surface of the notch 24A1) of the one side land 24A is arranged in a position of being spaced by a dimension L33 as a third distance from an axial other-side end surface of the annular groove 71B.

Here, the dimensions L31, L32, L33 are set to a relationship that the dimension L31 is smaller than the dimension L32 (L31<L32) and the dimension L31 is smaller than the dimension L33 (L31<L33). In addition, the annular groove 71B of the main spool insertion hole 71 is set to a relationship that the dimension L33 as a distance from the axial other-side end surface to the axial other-side end surface (that is, the bottom surface of the notch 24A1) of the one side land 24A is smaller than the dimension L32 as a distance from the axial one-side end surface (that is, the bottom surface of the notch 24B1) of the other side land 24B to the axial one-side end surface of the annular groove 71D. That is, the dimensions L31, L32, L33 are set to a relationship of the following formula 3.

$$L31<L33<L32 \qquad \text{[Formula 3]}$$

Therefore, when the main spool 24 axially moves from the initial state (waiting position) shown in FIG. 12 to the feedback pressure chamber 26-side, as a characteristic line 72 shown in a solid line in FIG. 14 the throttle passage 30 opens in an opening amount in accordance with a moving amount (movement of the dimension L31 or more) of the main spool 24, and the pilot pressure chamber 25 is communicated with the first tank port 15 through the throttle passage 30.

During the above period, the notch 24A1, which is in the axial other side, of the one side land 24A of the main spool 24 gradually approaches the other-side end surface of the annular groove 71B to reduce an opening amount between both of them according to the characteristic line 73 shown in a dashed-dotted line, but the first tank port 15 is communicated with the output port 16. However, when the moving amount of the main spool 24 is equal to or more than the dimension L33, the notch 24A1 of the one side land 24A goes into the annular groove 71B to reduce the opening amount to be zero and block the first tank port 15 from the output port 16.

Further, when the moving amount of the main spool 24 is equal to or more than the dimension L32 (L32>L33), the other side land 24B is communicated with the inside of the annular groove 71D through the notch 24B1, and the output port 16 is communicated with the first pump port 17 (that is, the primary pressure port) in an opening amount according to a characteristic line 74 shown in a dotted line.

That is, when the main spool 24 moves from the waiting position (initial state) where the tip end part of the first pressure receiving part 28 abuts on the closing plug 22 to the axial other side (feedback pressure chamber 26-side), the pilot, pressure chamber 25 and the first tank port 15 are first communicated through the throttle passage 30. After that, the output port 16 is blocked from the first tank port 15, and finally, the output port 16 is communicated with the first pump port 17.

In this way, also the fourth embodiment as configured above can suppress the self-excited vibration of the main spool 24 to output the stable controlled secondary pressure from the output port 16. Therefore, the fourth embodiment can acquire an effect as similar to that of the first embodiment. Particularly, according to the fourth embodiment, the annular groove 71B of the main spool insertion hole 71 is set to a relationship of the above formula 3 that the dimension L33 from the axial other-side end surface to the axial other-side end surface (that is, the bottom surface of the notch 24A1) of the one side land 24A is smaller than the dimension L32 from the axial one-side end surface (that is, the bottom surface of the notch 24B1) of the other side land 24B to the axial one-side end surface of the annular groove 71D.

Thereby, balance between the hydraulic force F1 by the controlled primary pressure (pilot pressure) acting on the main spool 24, the hydraulic force F2 by the pressure (controlled secondary pressure) in the output port 16 and the urging force f by the first return spring 27 is brought in to stabilize the movement of the main spool 24. In this state (for example, in a state where the main spool 24 is substantially stopped), as shown in FIG. 13, the output port 16 is blocked from the first tank port 15, and at the same time, the first pump port 17 is blocked from the output port 16. Therefore, at the time of controlling the pressure (controlled secondary pressure) of the output port, it is possible to reduce a leak flow amount from the first pump port 17 to the first tank port 15.

It should be noted that the fourth embodiment is explained by taking a case where the dimensions L31 to L33 shown in FIG. 12 are set to the relationship of the above formula 3 by changing, for example, the shape (position) of each of the annular grooves 71B, 71D out of the annular grooves 71A to 71E of the main spool insertion hole 71, as an example. The present invention is, however, not limited thereto, but may be configured to set the dimensions L31 to L33 to the relationship of the above formula 3 by changing a shape (axial length) of each of the lands 24A, 24B of the main spool 24, for example.

In addition, the first embodiment is explained by taking a case where the one side land 24A of the main spool 24 is provided with the notch 24A1 and the other side land 24B of the main spool 24 is provided with the notch 24B1, as an example. However, the present invention is not limited thereto, but, for example, as a modification shown in FIG. 15, the one side land 24A and the other side land 24B of the main spool 24 may be formed in a shape without a notch. In this case, when the main spool 24 is in the initial state (waiting position), the other side land 24B may be arranged in a position where an end surface thereof in the axial one side is spaced by a dimension L12 from the axial one-side end surface of the annular groove 13D. The one side land 24A may be arranged in a position where an end surface thereof in the axial other side is spaced by a dimension L13 from the axial other-side end surface of the annular groove 13B. The configuration of this modification may be likewise applied to the second to fourth embodiments.

In addition, each of the aforementioned embodiments is explained by taking a case where the closing part that closes the opening end of each of the main spool insertion holes 13, 61, 71 is configured of the closing plug 22, as an example. However, the closing part adopted by the present invention is not limited to the closing plug 22 as long as the end surface of the main spool 24 is configured to be capable of abutting on the closing part. For example, the closing part may be configured as similar to the configuration of closing the opening end with a part of the housing 12 in the same way with the bottom part of the solenoid valve cartridge insertion hole 14 as shown in FIG. 4. The closing part to be used in the present invention is designed to be capable of defining the first distance to the third distance in a state of abutting on the end surface of the main spool 24.

On the other hand, each of the aforementioned embodiments is explained by taking a case where the solenoid actuator 32 in the solenoid valve device 31 that generates the controlled primary pressure in the pilot pressure chamber 25 is configured of the electromagnetic proportional solenoid, as an example. However, the present invention is not limited thereto, but the solenoid valve device may be configured of any structure that can generate the controlled primary pressure increasing/decreasing depending upon the control amount of the electrical type control device (for example, the control lever device 10) in the pilot pressure chamber 25.

In addition, the pressure reducing valve units 11A, 11B according to each of the aforementioned embodiments are explained by taking a case of variably controlling the controlled primary pressure in the pilot pressure chamber 25 by the solenoid valve device 31, as an example. However, the present invention is not limited thereto, but it is possible to variably control the controlled primary pressure in the pilot pressure chamber 25 by using a remote control device composed of a hydraulic pilot valve of a pressure reducing valve type, for example.

Further, each of the aforementioned embodiments is explained by taking a case of applying the pressure reducing valve units 11A, 11B to the driving hydraulic circuit of the hydraulic cylinder 3 to be mounted on the large-sized hydraulic excavator, as an example. However, the present invention is not limited thereto, but may be applied to a hydraulic circuit for a hydraulic motor drive, for example. Further, the present invention may be applied to a capacity control valve that performs a tilting angle control of a fluid-pressure rotary machine of a variable capacity type (hydraulic pump or hydraulic motor), and the like.

DESCRIPTION OF REFERENCE NUMERALS

1 Hydraulic pump
2: Tank
3: Hydraulic cylinder (Hydraulic actuator)
4: Directional control valve (Control valve)
4A, 4B: Hydraulic pilot part
5A, 5B: Pilot line
7: Pilot pump
10: Control lever device (Electrical type control device)
11A, 11B: Pressure reducing valve unit
13, 61, 71: Main spool insertion hole (Spool hole)
13B, 61B, 71B: First annular groove
13C, 61C, 71C: Second annular groove
13D, 61D, 71D: Third annular groove
14: Solenoid valve cartridge insertion hole
15: first tank port (Tank port)
16: Output port
17: First pump port (Primary pressure port)
21: Spool valve device
22: Closing plug (Closing part)
24: Main spool (Spool)
24A: One side land (First land part)
24B: Other side land (Second land part)
25: Pilot pressure chamber
26: Feedback pressure chamber
27: First return spring (Elastic body)
28: First pressure receiving part
29: Second pressure receiving part
30, 51: Throttle passage
31: Solenoid valve device
32: Solenoid actuator
33: Pressure control valve
42: Control pressure line
43: Tank line

The invention claimed is:

1. A pressure reducing valve unit comprising:
a housing that has a primary pressure port, a tank port and an output port and is provided with a spool hole formed to communicate with each of said ports;
a closing part that closes said spool hole from an axial one side;
a spool that is inserted in said spool hole of said housing, said spool moving in an axial direction of said spool hole to communicate one of said primary pressure port and said tank port with said output port and block another of said primary pressure port and said tank port from communicating with said output port;
a pilot pressure chamber that is positioned between an axial one side of said spool and said closing part and is formed in said housing;
an elastic body that is positioned in an axial other side of said spool and is provided in said housing to urge said spool toward the axial one side;
a first pressure receiving part that is provided in said spool for moving said spool toward the axial other side against said elastic body with a force in accordance with a pressure in said pilot pressure chamber and receives the pressure in said pilot pressure chamber; and
a second pressure receiving part that is provided in said spool for moving said spool together with said elastic body toward the axial one side with a force in accordance with a pressure in said output port and receives the pressure in said output port, wherein:
said spool hole includes:
a first annular groove that is communicated with said tank port;
a second annular groove that is communicated with said output port; and
a third annular groove that is communicated with said primary pressure port,
said spool includes:
a first land part that is arranged in a position for communication or blocking between said first annular groove and said second annular groove in said spool hole; and
a second land part that is arranged in a position for communication or blocking between said second annular groove and said third annular groove in said spool hole, wherein
a throttle passage is provided between said first land part of said spool and said spool hole to communicate said pilot pressure chamber with said tank port and limit a flow amount of hydraulic oil to be discharged to said tank port from said pilot pressure chamber due to movement of said spool to the axial other side along said spool hole, wherein
in a state where said spool abuts on said closing part, a first distance as a distance between an end part of said throttle passage in the axial other side and an end surface of said first annular groove in the axial one side is set to be smaller than a second distance as a distance between an end surface of said second land part in the axial one side and an end surface of said third annular groove in the axial one side and a third distance as a distance between an end surface of said first land part in the axial other side and an end surface of said first annular groove in the axial other side.

2. The pressure reducing valve unit according to claim 1, wherein
said second distance is set to be smaller than said third distance.

3. The pressure reducing valve unit according to claim 1, wherein
said third distance is set to be smaller than said second distance.

4. The pressure reducing valve unit according to claim 1, further comprising:
a solenoid valve device that generates in said pilot pressure chamber a controlled primary pressure increasing/decreasing depending upon an operating amount of an electrical control device wherein
said spool moves to the axial other side along said spool hole due to reception of the controlled primary pressure in said pilot pressure chamber by said first pressure receiving part, and
said output port outputs a pressure as a controlled secondary pressure.

* * * * *